US012537006B2

(12) United States Patent
Bhatia et al.

(10) Patent No.: US 12,537,006 B2
(45) Date of Patent: Jan. 27, 2026

(54) INFORMATION PROCESSING METHOD, INFORMATION PROCESSING APPARATUS, AND COMPUTER PROGRAM

(71) Applicants: DAIKIN INDUSTRIES, LTD., Osaka (JP); FAIRY DEVICES INC., Tokyo (JP)

(72) Inventors: Vansh Bhatia, Osaka (JP); Anishram Senathi, Osaka (JP); Viraf Patrawala, Osaka (JP); Masato Fujino, Tokyo (JP)

(73) Assignees: DAIKIN INDUSTRIES, LTD., Osaka (JP); FAIRY DEVICES INC., Tokyo (JP)

( * ) Notice: Subject to any disclaimer, the term of this patent is extended or adjusted under 35 U.S.C. 154(b) by 0 days.

(21) Appl. No.: 18/993,502

(22) PCT Filed: Jul. 6, 2023

(86) PCT No.: PCT/JP2023/025079
§ 371 (c)(1),
(2) Date: Jan. 10, 2025

(87) PCT Pub. No.: WO2024/014386
PCT Pub. Date: Jan. 18, 2024

(65) Prior Publication Data
US 2025/0266044 A1    Aug. 21, 2025

(30) Foreign Application Priority Data

Jul. 13, 2022 (JP) ................. 2022-112563

(51) Int. Cl.
*G10L 15/26* (2006.01)
*G06F 16/3329* (2025.01)
*G06F 16/783* (2019.01)

(52) U.S. Cl.
CPC ........ *G10L 15/26* (2013.01); *G06F 16/33295* (2025.01); *G06F 16/7834* (2019.01)

(58) Field of Classification Search
None
See application file for complete search history.

(56) References Cited

U.S. PATENT DOCUMENTS 5,835,667 A     11/1998  Wactlar et al.
8,010,157 B1 *   8/2011  Fujisaki ............ H04M 1/72415
                                           455/12.1

(Continued)

FOREIGN PATENT DOCUMENTS

JP    2016-136341 A    7/2016
JP    2016-170654 A    9/2016

(Continued)

OTHER PUBLICATIONS

International Search Report of corresponding PCT Application No. PCT/JP2023/025079 dated Sep. 19, 2023.

(Continued)

*Primary Examiner* — Neeraj Sharma
(74) *Attorney, Agent, or Firm* — GLOBAL IP COUNSELORS, LLP

(57) ABSTRACT

An information processing method, by a processing unit of an information processing apparatus, includes: converting voice data into character string data; generating question data by extracting a first word from the character string data; extracting a second word from the character string data by inputting the character string data and the question data to a trained language learning model configured to output, when the character string data and the question data are input, a word corresponding to an answer to the question data from the character string data; and storing the voice data, the first word, and the second word in association with each other.

19 Claims, 21 Drawing Sheets

(56) References Cited

U.S. PATENT DOCUMENTS

| | | | | |
|---|---|---|---|---|
| 2007/0106685 | A1* | 5/2007 | Houh | G06F 16/23 |
| | | | | 707/999.102 |
| 2011/0162004 | A1* | 6/2011 | Yerli | A63F 13/215 |
| | | | | 725/37 |
| 2015/0244903 | A1* | 8/2015 | Adams | G02B 27/0172 |
| | | | | 348/376 |
| 2015/0339382 | A1* | 11/2015 | Skolicki | H04N 21/8549 |
| | | | | 707/722 |
| 2018/0011830 | A1 | 1/2018 | Iida et al. | |
| 2018/0124356 | A1* | 5/2018 | Ferrer Zaera | G10L 25/60 |
| 2019/0163274 | A1* | 5/2019 | Sun | G06F 3/012 |
| 2019/0206425 | A1* | 7/2019 | Chen | H04N 23/60 |
| 2019/0236976 | A1* | 8/2019 | Horban | H04R 1/406 |
| 2019/0369957 | A1* | 12/2019 | Spector | G06F 16/951 |
| 2021/0311480 | A1* | 10/2021 | Yang | G05B 13/0265 |
| 2021/0326524 | A1 | 10/2021 | Zeng et al. | |
| 2023/0251721 | A1* | 8/2023 | Singh | G06F 3/167 |
| | | | | 715/863 |
| 2023/0410988 | A1* | 12/2023 | Ishikawa | G16H 30/40 |

FOREIGN PATENT DOCUMENTS

| | | | |
|---|---|---|---|
| JP | 2022-13256 | A | 1/2022 |
| JP | 2022-39973 | A | 3/2022 |

OTHER PUBLICATIONS

Written Opinion of International Searching Authority of corresponding PCT Application No. PCT/JP2023/025079 dated Sep. 19, 2023.
European Search Report of corresponding EP Application No. 23 83 9558.6 dated Sep. 24, 2025.

* cited by examiner

Moving Image DB

FIG.16

| Report Template | |
|---|---|
| Item | |
| Repair Location | |
| Inquiry Number | |
| Customer Name | |
| Customer Address | |
| Telephone Number | |
| Model Name | |
| Repair Date and Time | |

FIG.17

Moving Image DB

| Moving Image Data | Capturing Date and Time | File Index Information | Scene Data | Report Data |
|---|---|---|---|---|
| | | First Word: Second Word | | |

12b

| No | End Frame | Start | End | Scene Index Information |
|---|---|---|---|---|
| 1 | 3 7 2 | 00:00 | 00:12 | First Word: Second Word |
| 2 | 6 5 1 | 00:12 | 00:23 | First Word: Second Word |
| 3 | ... | ... | ... | ... |

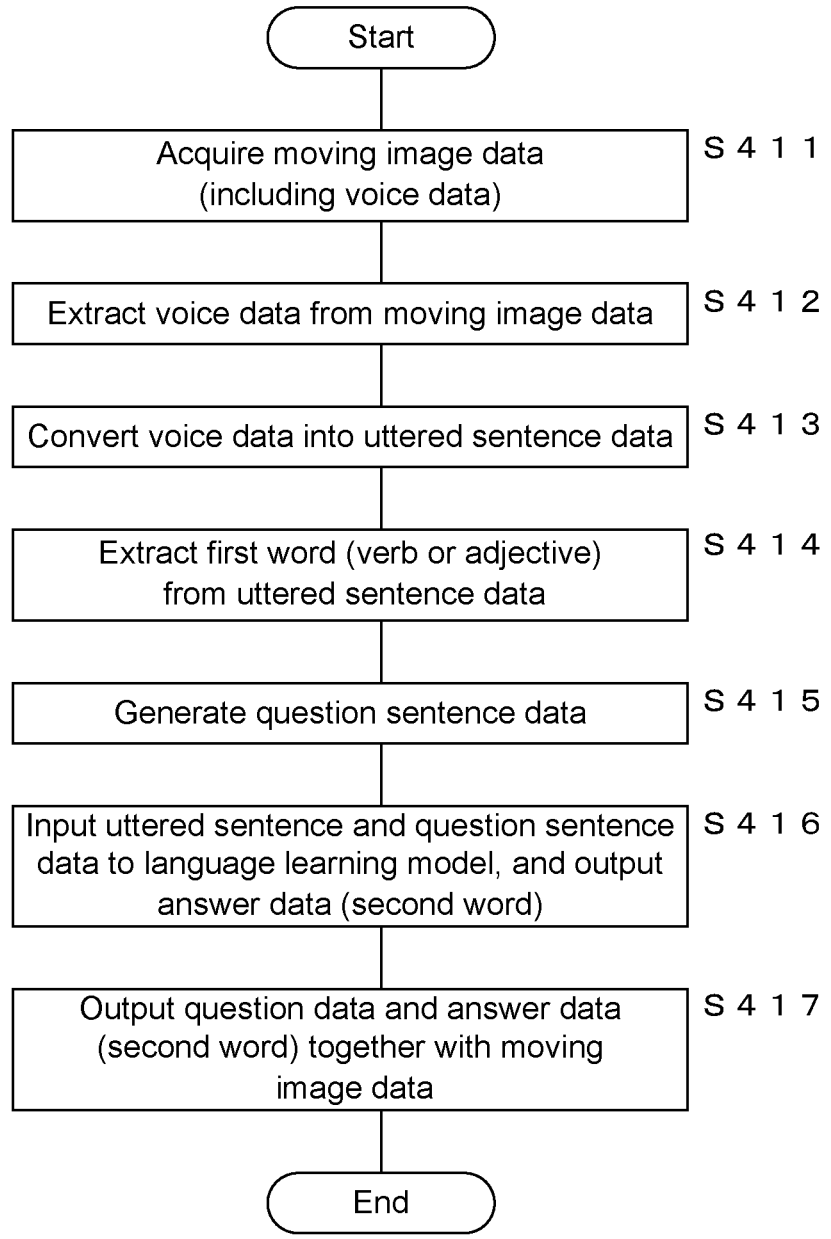

INFORMATION PROCESSING METHOD, INFORMATION PROCESSING APPARATUS, AND COMPUTER PROGRAM

CROSS-REFERENCE TO RELATED APPLICATIONS

This application is the national phase under 35 U. S. C. § 371 of PCT International Application No. PCT/JP2023/025079, filed on Jul. 6, 2023. This U.S. National stage application claims priority to Japanese Patent Application No. 2022-112563, filed on Jul. 13, 2022, the entire contents of which are hereby incorporated herein by reference.

BACKGROUND

Technical Field

The present disclosure relates to an information processing method, an information processing apparatus, and a computer program.

Background Art

Japanese Unexamined Patent Application Publication No. 2016-170654 discloses a technique of, with an image capturing unit, a recording unit, and a conversion unit that converts voice included in recorded data into a character string, extracting a noun from a character string, acquiring a related word associated with the extracted noun from a dictionary unit, and storing captured image data, the noun, and the related word in association with each other.

SUMMARY

An information processing method according to a first aspect of the present disclosure includes: converting voice data into character string data; extracting a second word from the character string data by using question data including a first word; and storing the voice data, the first word, and the second word in association with each other.

BRIEF DESCRIPTION OF THE DRAWINGS

FIG. 16 is a schematic view illustrating an example of a report template.

FIG. 17 is a conceptual diagram illustrating an example of a moving image DB according to the second embodiment.

FIG. 21 is a flowchart illustrating an index information generation processing procedure according to a fourth embodiment.

DETAILED DESCRIPTION OF EMBODIMENT(S)

Hereinafter, an information processing method, an information processing apparatus, and a computer program according to the present disclosure will be described in detail based on the drawings illustrating embodiments thereof.

First Embodiment

Work such as maintenance and inspection, repair, or installation for various facilities such as air conditioner units and chemical plants requires technical skill, and the work efficiency greatly varies depending on the level of the skill of workers. One possible method for supporting the work for an unskilled worker includes collecting and accumulating moving image data obtained by capturing the work performed by a skilled worker and providing the accumulated moving image data to the unskilled worker. Appropriate index information needs to be assigned to the moving image data to enable moving image data required by the unskilled worker to be searched for in the accumulated moving image data.

The present disclosure proposes an information processing method, an information processing apparatus, and a computer program (program product) with which captured or recorded moving image or voice data can be associated with index information accurately representing the content of the data.

System Configuration

Figure 1:
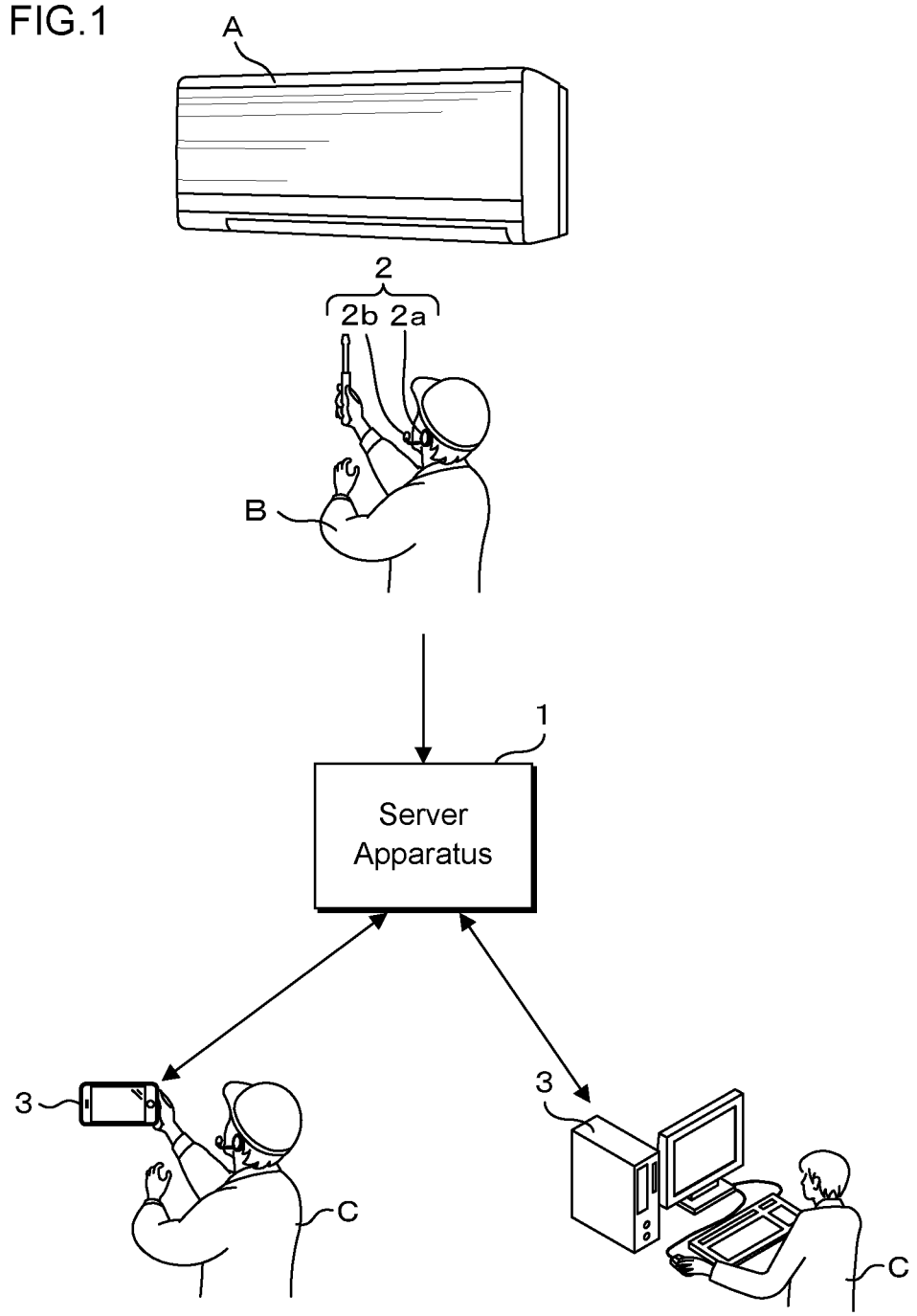
FIG. 1 is a schematic view illustrating an overview of an information processing system according to a first embodiment.

FIG. 1 is a schematic view illustrating an overview of an information processing system according to a first embodiment. The information processing system according to the first embodiment includes a server apparatus (an information processing apparatus or a computer) 1, a headset 2, and a terminal device 3. The server apparatus 1 is communicatively connected to the headset 2 and the terminal device 3 via a wired or wireless communication network such as a mobile phone communication network, a wireless local area network (LAN), and the Internet.

The headset 2 is a device that is worn on the head of a worker who performs work such as maintenance and inspection, repair, or installation for an air conditioner unit A, in particular, a skilled worker B. The headset 2 includes a camera 2a, a microphone 2b, headphones, and the like, and captures an image and collects sound showing how the skilled worker B performs work. Moving image data is assumed to include voice data obtained by collecting sound using the microphone 2b.

The headset 2 is an example of a device that captures an image and collects sound showing how the skilled worker B performs the work, and may be another wearable device or a mobile terminal having an image capturing function and a sound collecting function. Instead of the headset 2, the camera 2a and the microphone 2b installed around the air conditioner unit A and the skilled worker B may be adopted.

The moving image data obtained by the image capturing and the sound collection is provided to the server apparatus 1. For example, when the headset 2 includes a communication circuit, the headset 2 transmits the moving image data to the server apparatus 1 by wired or wireless communication. The headset 2 may be configured to transmit the moving image data to the server apparatus 1 via a communication terminal such as a personal computer (PC) or a smartphone. When the headset 2 does not have a communication circuit, the headset 2 records the moving image data in a recording device such as a memory card or an optical disk. The moving image data is provided from the headset 2 to the server apparatus 1 via the recording device.

The method of providing the moving image data from the headset 2 to the server apparatus 1 described above is an example, and any known method may be adopted.

The server apparatus 1 acquires the moving image data provided from the headset 2 and accumulates the acquired moving image data in a moving image DB 12b. The terminal device 3 is a general-purpose communication terminal such as a smartphone or a PC used by an unskilled worker C who learns and performs work such as maintenance and inspection, repair, or installation for the air conditioner unit A. The terminal device 3 accesses the server apparatus 1 and requests a search for moving image data desired by the unskilled worker C. The server apparatus 1 searches for moving image data in response to a request from the terminal device 3, and transmits the required moving image data to the terminal device 3. The terminal device 3 receives the moving image data transmitted in response to the request. The terminal device 3 plays the received moving image data to display a moving image in which how the skilled worker B performs the work is recorded. The unskilled worker C can learn the technique of the skilled worker B using the moving image displayed on the terminal device 3.

Apparatus Configuration

Figure 2:
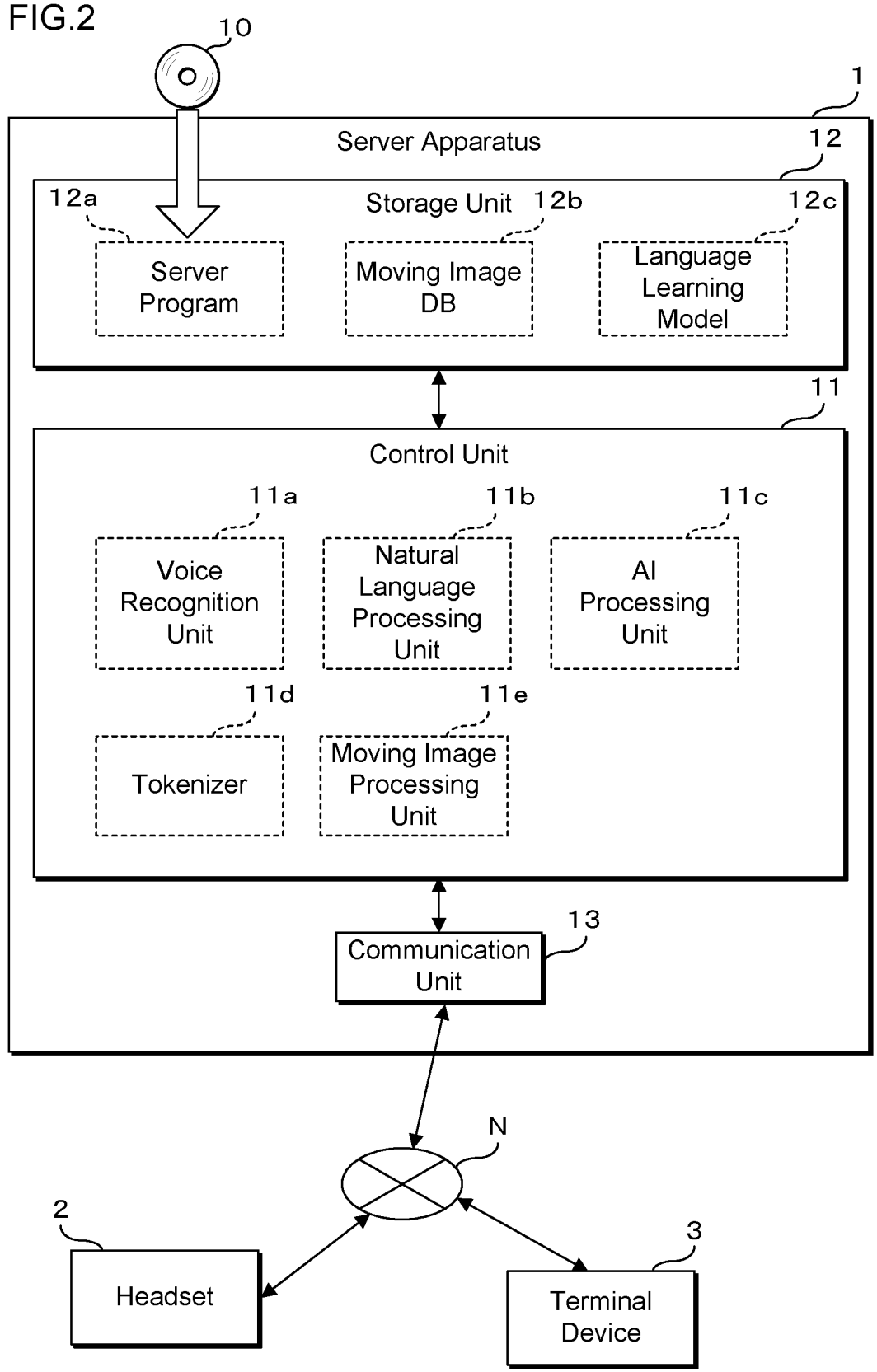
FIG. 2 is a block diagram illustrating a configuration of a server apparatus according to the first embodiment.

FIG. 2 is a block diagram illustrating a configuration of the server apparatus 1 according to the first embodiment. The server apparatus 1 according to the first embodiment includes a control unit 11, a storage unit (storage) 12, and a communication unit (transceiver) 13.

The control unit 11 includes a calculation processing device such as a central processing unit (CPU), a microprocessing unit (MPU), a graphics processing unit (GPU), or a quantum processor, a read only memory (ROM), a random access memory (RAM), and the like. The control unit 11 reads and executes a server program (computer program) 12a stored in the storage unit 12, thereby executing processing of assigning index information to the accumulated moving image data. The index information is information indicating the content of the moving image data using a plurality of words. The control unit 11 executes processing such as searching for required moving image data with reference to the index information and transmitting the moving image data to the terminal device 3.

The control unit 11 functions as a voice recognition unit 11a, a natural language processing unit 11b, an AI processing unit 11c, a tokenizer 11d, and a moving image processing unit 11e. The functional units may each be realized by software with the control unit 11 reading and executing the server program 12a, or some or all of the functional units may be realized by hardware using a circuit. The overview of each functional unit is as follows.

The voice recognition unit 11a is a component that converts the voice data included in the moving image data into uttered sentence data (character string data). The uttered sentence data is character string data obtained by converting the uttered content of the skilled worker B into text.

The natural language processing unit 11b is a component that divides a character string represented by the uttered sentence data into morphemes through morphological analysis to extract a first word (verb or adjective), and generates question sentence data by using the extracted first word. The natural language processing unit 11b is a component that executes rule-based processing without using a language learning model 12c obtained by machine learning. The question sentence data is data for extracting a meaningful noun from the uttered sentence data.

The AI processing unit 11c is a component that inputs the question sentence data and the uttered sentence data to the language learning model 12c that has been trained, and makes the model output answer data corresponding to an answer to the question sentence from the uttered sentence data. The answer data includes a second word that is a noun.

The tokenizer 11d is a lexical analyzer, and functions as an encoder for encoding the question sentence data and the uttered sentence data described above into data processable by the language learning model 12c. When BERT is used as the language learning model 12c, the tokenizer 11d encodes the question sentence data and the uttered sentence data into embedded tensor data. Specifically, the tokenizer 11d divides the question sentence data and the uttered sentence data into tokens (terms) each of which is a minimum unit of a word, and converts each of the tokens into tensor data of a token string in which token IDs are arranged. The tokenizer 11d inserts a special token [CLS] at the beginning of the sentence, and embeds a special token [SEP] between the token string of the question sentence data and the token string of the uttered sentence data. The tokenizer 11d adds, to the tensor data of a token string, segment information for identification for determining whether each token is a token corresponding to a question sentence or a token corresponding to an uttered sentence. The tokenizer 11d adds, to the tensor data of the token string, position information indicating the arrangement order of a plurality of tokens corresponding to the question sentence and the uttered sentence.

The tokenizer 11d also functions as a decoder for decoding the tensor data output from the language learning model 12c into character string data.

The moving image processing unit 11e is a component that, for example, executes processing such as analyzing moving image data and dividing the moving image data, which is a single file, into a plurality of scenes. In the first embodiment, an example in which index information is added to moving image data, which is a single file, will be described below. A method of adding index information to each of a plurality of divided scenes will be described in a second embodiment.

The storage unit 12 is, for example, a large-capacity storage device such as a hard disk. The storage unit 12 stores the server program 12*a* to be executed by the control unit 11, and various types of data required by the control unit 11 to execute the processing. The storage unit 12 forms a moving image database (DB) 12*b* in which moving image data obtained by image capturing and sound collection using the camera 2*a* and the microphone 2*b* is accumulated. The storage unit 12 stores the language learning model 12*c* for generating the index information to be given to moving image data. The storage unit 12 may be an external storage device connected to the server apparatus 1.

The server program 12*a* may be recorded in a recording medium 10 in a computer-readable manner. The storage unit 12 stores the server program 12*a* read from the recording medium 10 by a reading device. The recording medium 10 is a semiconductor memory, an optical disk, a magnetic disk, a magneto-optical disk, or the like. The server apparatus 1 may download the server program 12*a* according to the first embodiment from an external server connected to a network N and store the server program 12*a* in the storage unit 12.

Figure 3:
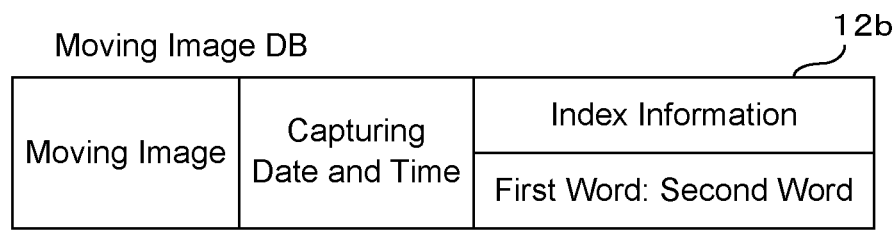
FIG. 3 is a conceptual diagram illustrating an example of a moving image DB according to the first embodiment.

FIG. 3 is a conceptual diagram illustrating an example of the moving image DB 12*b*. The moving image DB 12*b* is a database that stores moving image data obtained by image capturing and sound collection using the camera 2*a* and the microphone 2*b*, date and time of the image capturing, and index information generated by the information processing method according to the first embodiment in association with each other. The index information is information including a first word and a second word to be described below.

Figure 4:
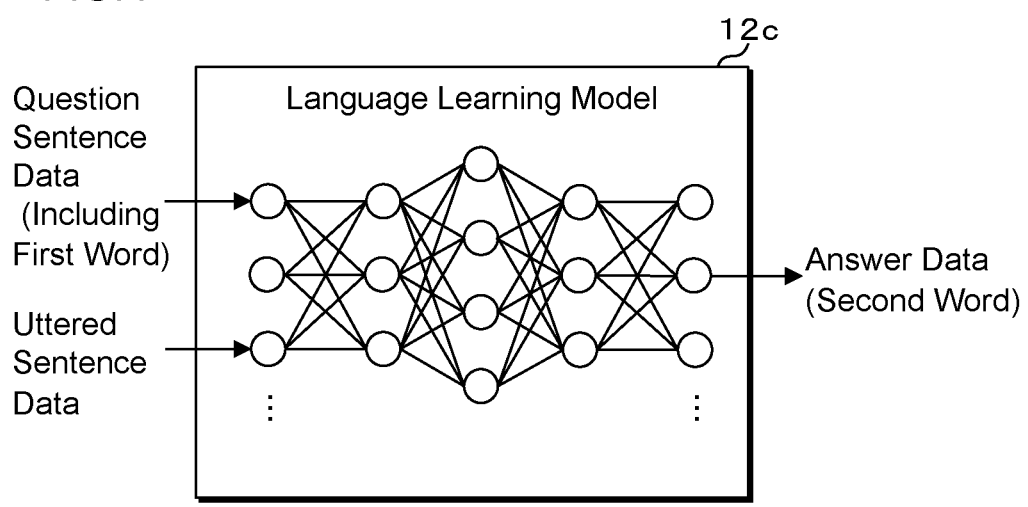
FIG. 4 is a block diagram illustrating a configuration of a language learning model according to the first embodiment.

FIG. 4 is a block diagram illustrating a configuration of the language learning model 12*c* according to the first embodiment. The language learning model 12*c* is a trained machine learning model that outputs answer data corresponding to an answer to a question represented by question sentence data from uttered sentence data, when the question sentence data and the uttered sentence data are input. The language learning model 12*c* is configured using, for example, a deep neural network. The configuration of the language learning model 12*c* is not limited, but BERT is suitable. In the following description, it is assumed that the language learning model 12*c* is configured by BERT.

Figure 5:
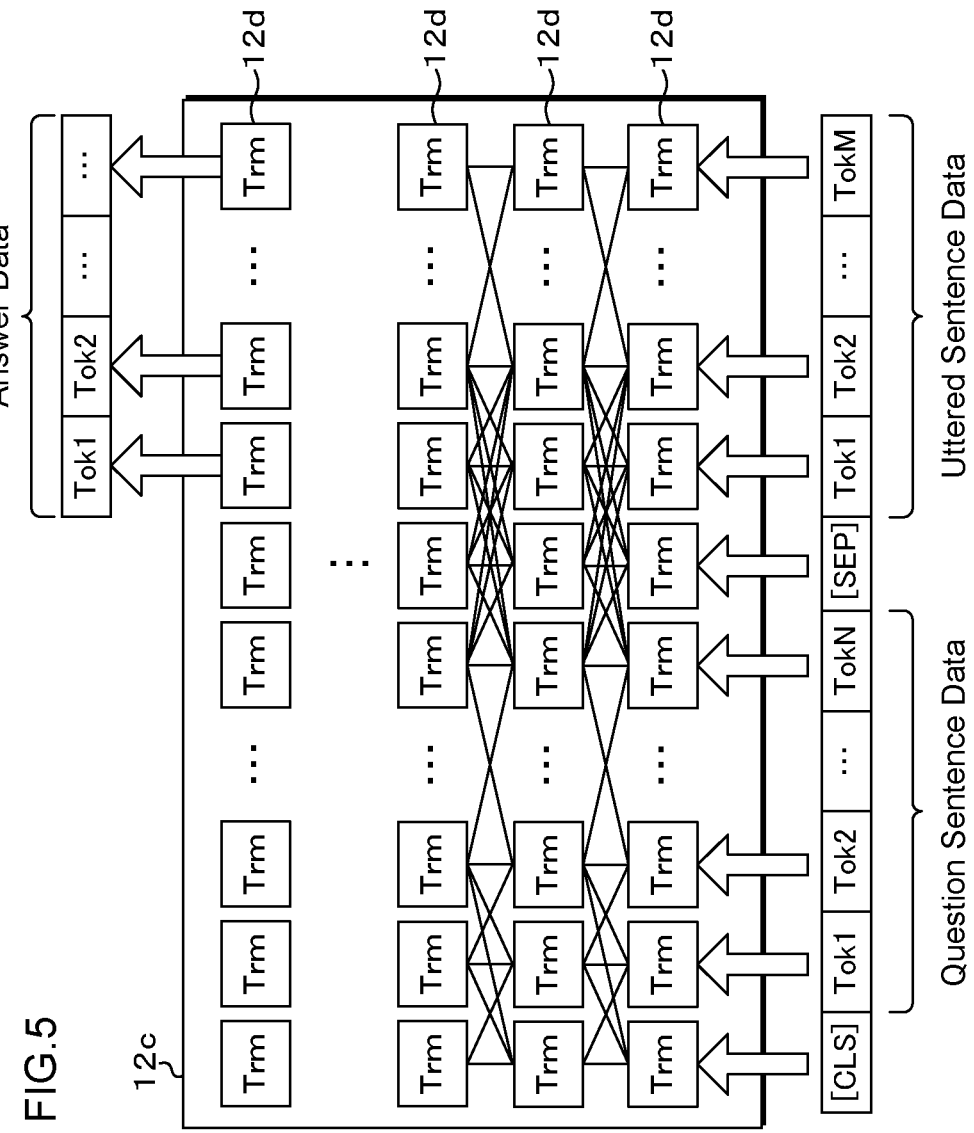
FIG. 5 is a block diagram illustrating a configuration of BERT as an example of the language learning model according to the first embodiment.

FIG. 5 is a block diagram illustrating a configuration of BERT as an example of the language learning model 12*c* according to the first embodiment. The language learning model 12*c* configured by BERT includes a plurality of connected transformer encoders (Trm) 12*d*. The transformer encoder 12*d* at the first stage corresponding to the input layer includes a plurality of nodes to which the element values of the tensor data of the question sentence data and the uttered sentence data are input. On the lower side in FIG. 5, "Tok1" to "TokN" represent the token IDs of the question sentence data, "Tok1" to "TokM" represent the token IDs of the uttered sentence data, and "CLS" and "SEP" represent the special tokens. Each of the plurality of transformer encoders 12*d* corresponding to the intermediate layers executes calculation processing corresponding to a required task on the value output from the node of the transformer encoder 12*d* at the previous stage, and outputs a result to the transformer encoder 12*d* at the subsequent stage. BERT according to the first embodiment executes calculation processing for extracting a token corresponding to an answer to a question sentence. The transformer encoders 12*d* at the final stage corresponding to the output layer have the same number of nodes as the transformer encoders 12*d* at the first stage, and output the tensor data of the answer sentence. In FIG. 5, the "Tok1", "Tok2", . . . on the upper side represent the token IDs of the answer data.

The language learning model 12*c*, which is BERT, can be trained by pre-learning and fine-tuning. The pre-learning is performed using unlabeled learning data. Specifically, a neural network is trained by word prediction learning (masked LM (MLM)) and next sentence prediction (NSP) learning. With the word prediction learning, a part of a token string, which is an input sentence of the learning data is masked, and the weight coefficient of the transformer encoder 12*d* is optimized so that the masked token can be predicted. With the next sentence prediction learning, the weight coefficient of the transformer encoder 12*d* is optimized so that whether a first character string and a second character string are sequential character strings.

With the fine tuning, the weight coefficient of the transformer encoder 12*d* is finely corrected so that the tensor data of desired answer data is output when the tensor data of the question sentence data and the uttered sentence data are input.

The language learning model 12*c* may perform the fine tuning for BERT by using the question sentence data and the uttered sentence data that are actually used, or BERT fine tuned by using general character string data may be used.

The communication unit 13 communicates with the headset 2 and the terminal device 3 via the network N including a mobile phone communication network, a wireless LAN, the Internet, and the like. The communication unit 13 transmits data given from the control unit 11 to the headset 2 or the terminal device 3, and gives data received from the headset 2 or the terminal device 3 to the control unit 11.

While an example in which the server apparatus 1 is configured by one computer device has been described, the server apparatus 1 may alternatively be a multi-computer that includes a plurality of computers and executes distributed processing. The server apparatus 1 may be a virtual machine virtually constructed by software.

Figure 6:
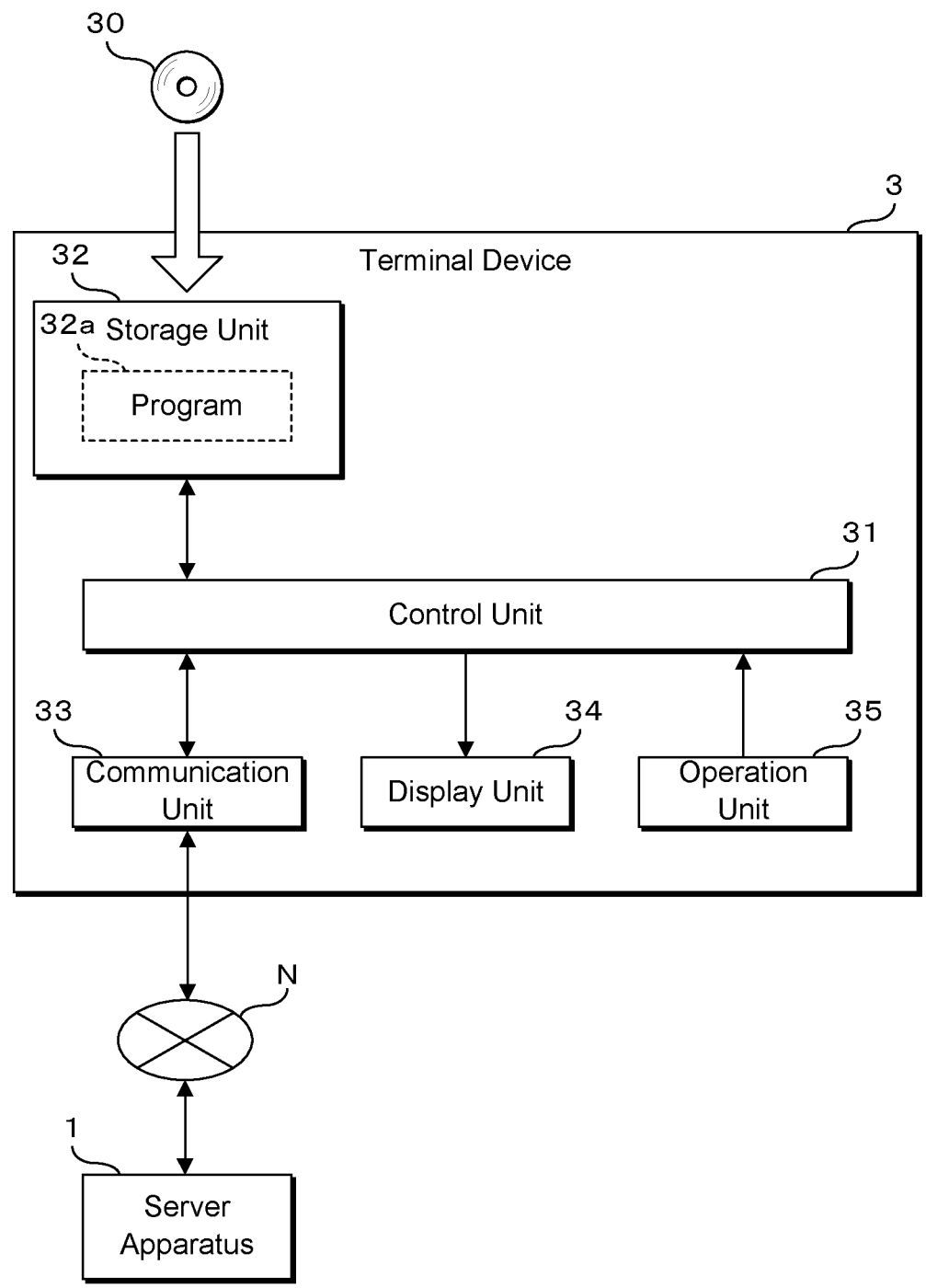
FIG. 6 is a block diagram illustrating a configuration of a terminal device according to the first embodiment.

FIG. 6 is a block diagram illustrating a configuration of the terminal device 3 according to the first embodiment. The terminal device 3 includes a control unit 31, a storage unit 32, a communication unit (transceiver) 33, a display unit (display) 34, and an operation unit 35.

The control unit 31 includes a calculation processing unit such as a CPU or an MPU, a ROM, and the like. The control unit 31 reads and executes a terminal program 32*a* stored in the storage unit 32 to execute search request processing for moving image data accumulated in the moving image DB 12*b* of the server apparatus 1 and play processing (display processing) for moving image data provided from the server apparatus 1. The terminal program 32*a* may be a dedicated program related to the information processing method according to the first embodiment, or may be a general-purpose program such as an Internet browser or a web browser.

The storage unit 32 is, for example, a nonvolatile memory element such as a flash memory or a storage device such as a hard disk. The storage unit 32 stores the terminal program 32*a* to be executed by the control unit 31, and various types of data required by the control unit 31 to execute the processing. The terminal program and data may be recorded in a recording medium 30 in a computer-readable manner. The storage unit 32 stores the terminal program 32*a* read from the recording medium 30 by the reading device. The recording medium 30 is a semiconductor memory, an optical disk, a magnetic disk, a magneto-optical disk, or the like. The terminal device 3 may download the terminal program 32a according to the first embodiment from an external server connected to the network N and store the terminal program in the storage unit 12.

The communication unit 33 communicates with the server apparatus 1 via the network N. The communication unit 33 transmits data given from the control unit 31 to the server apparatus 1, and gives data received from the server apparatus 1 to the control unit 31.

The display unit 34 is a liquid crystal panel, an organic EL display, or the like. The display unit 34 displays a moving image, a still image, characters, and the like according to data given from the control unit 31.

The operation unit 35 is an input device such as a touch panel, a soft key, a hard key, a keyboard, or a mouse. The operation unit 35 receives, for example, an operation of the unskilled worker C and notifies the control unit 31 of the received operation.

Information Processing Method (Generation and Assignment of Index Information)

The server apparatus 1 can generate the index information accurately representing the content of the moving image data obtained by capturing an image showing how the skilled worker B performs work such as maintenance and inspection, repair, or installation for the air conditioner unit A.

Figure 7:
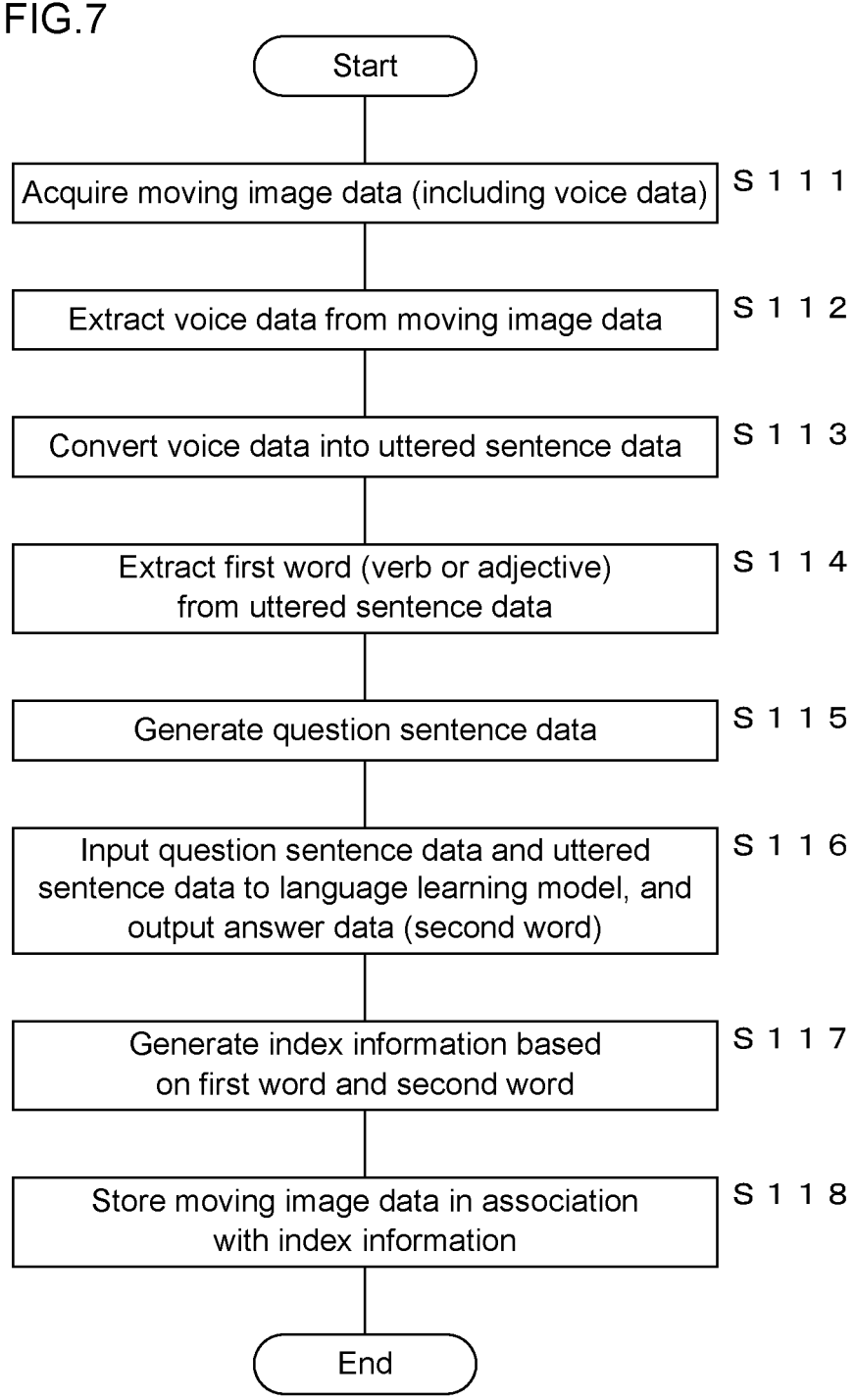
FIG. 7 is a flowchart illustrating an index information generation processing procedure according to the first embodiment.
Figure 8:
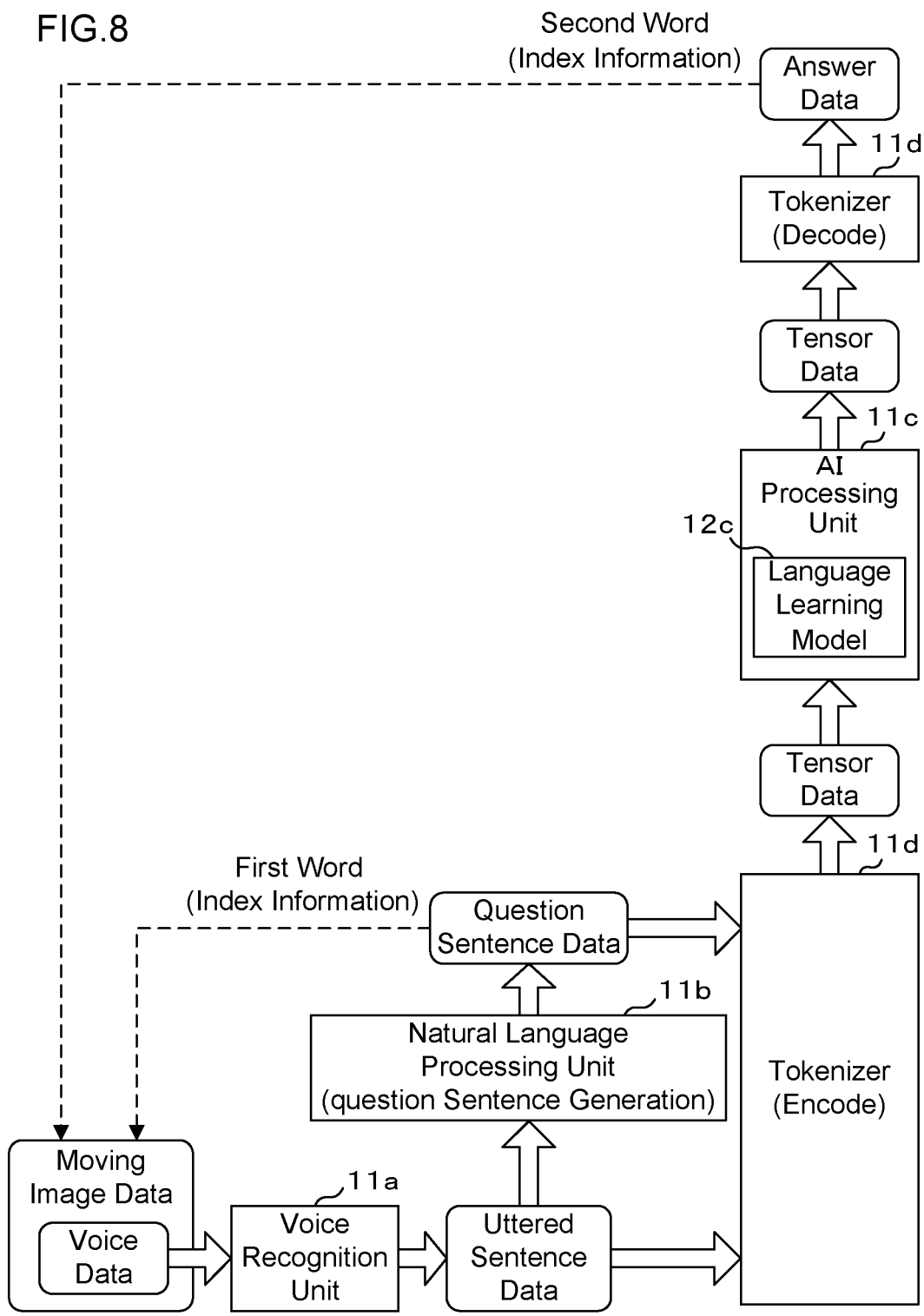
FIG. 8 is a conceptual diagram illustrating an index information generation processing method according to the first embodiment.

FIG. 7 is a flowchart illustrating an index information generation processing procedure according to the first embodiment, and FIG. 8 is a conceptual diagram illustrating an index information generation processing method according to the first embodiment. The control unit 11 of the server apparatus 1 acquires the moving image data (step S111). For example, the server apparatus 1 acquires the moving image data by receiving the moving image data transmitted from the headset 2 through the communication unit 13. The moving image data is obtained by capturing an image and collecting sound showing how the skilled worker B performs the work, and includes voice data. The server apparatus 1 may acquire the moving image data by reading the moving image data stored in the storage unit 12 or an external storage device.

The control unit 11 extracts voice data from the acquired moving image data (step S112). The control unit 11 or the voice recognition unit 11a executes voice recognition processing to convert the extracted voice data into the uttered sentence data in a text format (step S113). The control unit 11 or the natural language processing unit 11b divides the uttered sentence data into morphemes through morphological analysis processing, and extracts one or a plurality of first words that are verbs or adjectives (step S114). For example, the first words may be verbs such as "repair" or "replace", or adjectives such as "hot" or "slow". The control unit 11 may extract all verbs and adjectives included in the uttered sentence data as the first words, or may extract a predetermined number of verbs and adjectives as the first words. The control unit 11 may randomly extract a predetermined number of verbs and adjectives as the first words. The control unit 11 may extract a predetermined number of verbs and adjectives as the first words so that the variance of the degree of similarity is large. The control unit 11 may extract the first words such that the running time varies. The control unit 11 may extract, as the first words, a verb and an adjective with an application frequency in a predetermined range, for example, in a range of 10.

The control unit 11 or the natural language processing unit 11b generates one or a plurality of pieces of question sentence data based on one or a plurality of first words (step S115). For example, the control unit 11 may use a first word "repair" to generate question sentence data "What was repaired?" For example, the control unit 11 may use a first word "replace" to generate question sentence data "What has been replaced?"

A plurality of pieces of question sentence data may be generated based on one first word. For example, the control unit 11 may generate question sentence data "What was repaired?", "What was used for repair?", and "How was it repaired?"

The storage unit 12 may be configured to store a related-word dictionary. When the storage unit 12 stores the related-word dictionary, the control unit 11 generates question sentence data by using words related to "repair". For example, when the words related to "repair" include "problem", "part", "error code", or the like, question sentence data "What is the problem?", "What is the part?", and "What is the error code?" are generated.

The storage unit 12 may be configured to store fixed-phrase question sentence data. The control unit 11 may add the fixed-phrase question sentence data read from the storage unit 12 to the generated question sentence data. For example, question sentence data "What is the model number of the equipment?" may be added as a fixed-phrase question.

The control unit 11 inputs the question sentence data and the uttered sentence data to the language learning model 12c, and makes the model output answer data (step S116). When there are a plurality of pieces of question sentence data, a plurality of pieces of corresponding answer data are obtained. The answer data includes a second word, which is a noun. Specifically, the tokenizer 11d encodes the question sentence data and the uttered sentence data into tensor data. The control unit 11 inputs the encoded tensor data to the language learning model 12c, and makes the model output the tensor data associated with an answer sentence. The tokenizer 11d decodes the tensor data output from the language learning model 12c into answer data.

The control unit 11 generates index information based on the first word and the second word (step S117). For example, the index information is data in which the first word and the second word are arranged.

The control unit 11 stores the moving image data in association with the generated index information in the storage unit 12 (step S118). Specifically, the control unit 11 stores the moving image data and the index information in the moving image DB 12b.

Moving Image Search Processing

The unskilled worker C can search for and view the moving image data accumulated in the moving image DB 12b of the server apparatus 1 by using the terminal device 3.

Figure 9:
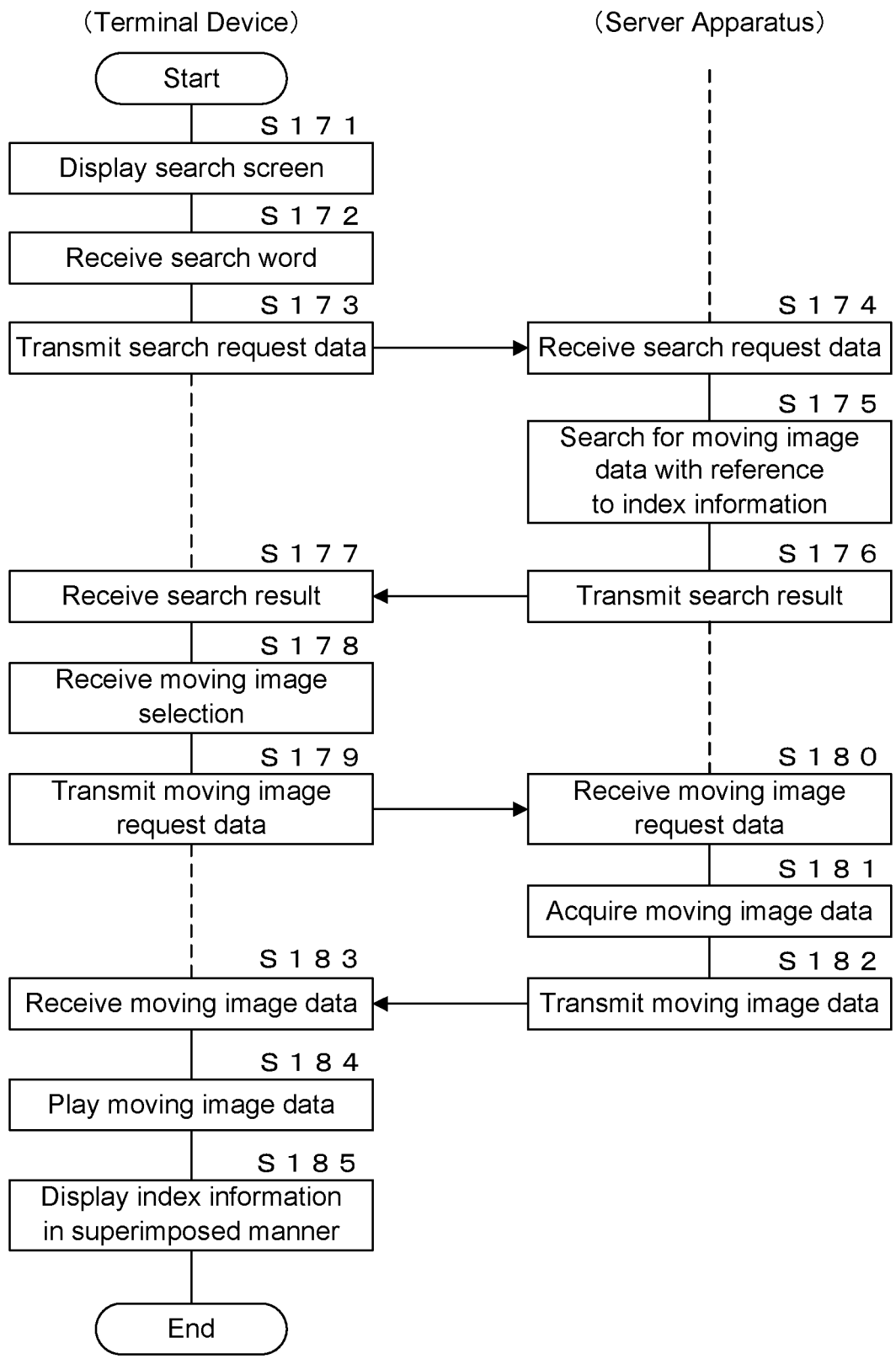
FIG. 9 is a flowchart illustrating a moving image search processing procedure according to the first embodiment.

FIG. 9 is a flowchart illustrating a moving image search processing procedure according to the first embodiment. The control unit 31 of the terminal device 3 makes a search screen for searching for moving image data stored in the moving image DB 12b of the server apparatus 1 displayed on the display unit 34 (step S171). The control unit 31 receives a search word through the operation unit 35 (step S172). The control unit 31 transmits search request data that includes the received search word, and is used for requesting for a search for the moving image data, to the server apparatus 1 through the communication unit 33 (step S173).

The server apparatus 1 receives the search request data transmitted from the terminal device 3 through the communication unit 13 (step S174). The control unit 11 of the server apparatus 1 that has received the search request data searches for moving image data that matches a search word included in the search request data by referring to the index information stored in the moving image DB 12b using the search word as a key (step S175). The control unit 11 transmits the result of the search in step S175 to the terminal device 3 that has transmitted the search request, through the communication unit 13 (step S176). The search result includes a file name, a thumbnail image, captured date and time, running time, index information, and the like of the moving image data.

The control unit 31 of the terminal device 3 receives the search result transmitted from the server apparatus 1, through the communication unit 33 (step S177). The control unit 31 makes the information of the search result displayed on the display unit 34, and the operation unit 35 receives the selection of a moving image to be played (step S178).

The control unit 31 transmits moving image request data that includes information indicating the selected moving image an example of which is the file name of the moving image data, and serves as a request for the moving image data, to the server apparatus 1 through the communication unit 33 (step S179).

The control unit 11 of the server apparatus 1 receives the moving image request data transmitted from the terminal device 3 through the communication unit 13 (step S180). The control unit 11 acquires the moving image data and index information indicated by the moving image request data from the moving image DB 12b (step S181). The control unit 11 transmits the read moving image data and index information to the terminal device 3 that has requested the moving image through the communication unit 13 (step S182).

The control unit 31 of the terminal device 3 receives the moving image data and index information transmitted from the server apparatus 1 through the communication unit 33 (step S183). The control unit 31 plays the received moving image data and makes it displayed on the display unit 34 (step S184). The control unit 31 makes the index information displayed in a superimposed manner on the moving image (step S185).

Figure 10:
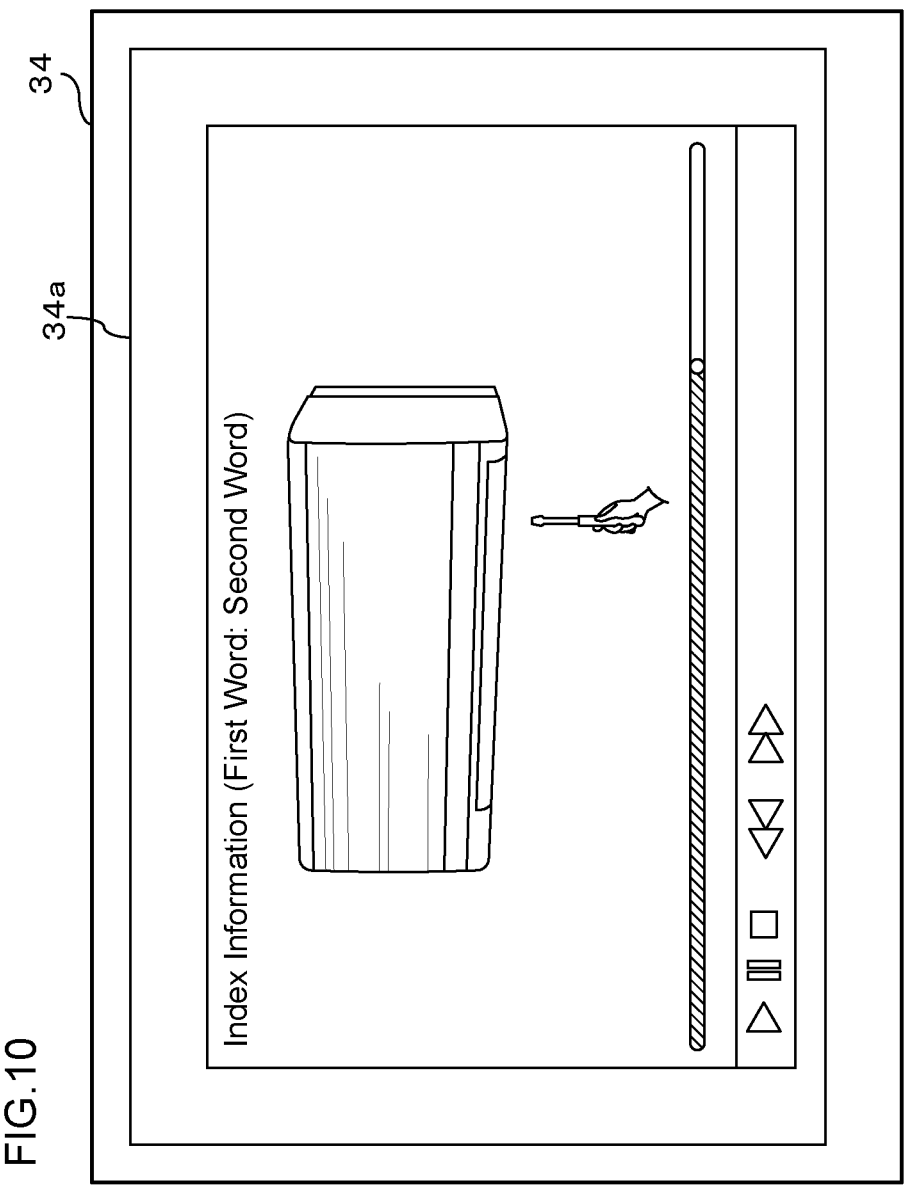
FIG. 10 is a schematic view illustrating an example of a moving image play screen according to the first embodiment.

FIG. 10 is a schematic view illustrating an example of a moving image play screen 34a according to the first embodiment. The terminal device 3 displays, for example, the moving image play screen 34a on the display unit 34. The terminal device 3 displays a moving image based on the moving image data received from the server apparatus 1, at the center of the moving image play screen 34a. The terminal device 3 displays the index information in a superimposed manner on the upper part or the lower part of the moving image. The terminal device 3 displays operation buttons such as a play button, a pause button, a stop button, a fast-forward button, a fast-rewind button, and the like at the lower part of the moving image play screen 34a, and displays the operation buttons on the moving image displayed at the center of the screen of the display unit 34. When any of the buttons is operated, the control unit 31 controls the playing of the moving image according to the operated button.

With the information processing system and the like according to the first embodiment, it is possible to store the moving image data in the moving image DB 12b in association with the index information that accurately represents the content of the moving image. Since the second word is extracted from the uttered sentence data using the question sentence data including the first word, the second word includes information corresponding to the question sentence data and having a meaning in terms of content. The first word and the second word are information accurately representing the content of the moving image data, and the first word and the second word can be associated with the moving image data as the index information.

By using the language learning model 12c, which is a machine learning model, it is possible to extract the second word more accurately representing the content of the uttered sentence data. In particular, by using BERT, the second word, which is more meaningful in terms of content, can be extracted from the uttered sentence data.

Since the question sentence data is generated using the first word extracted from the uttered sentence data, it is possible to extract the second word more accurately representing the content of the uttered sentence data. Since the first word is information included in the uttered sentence data of the moving image data, it is possible to obtain the question sentence data according to the content of the moving image data.

Since the first word in the question sentence data is a verb or an adjective, it is possible to generate the question sentence data suitable for extracting the second word, which is a noun, related to the verb or the adjective.

Since there are a plurality of first words and second words associated with the moving image data, it is possible to generate index information that more specifically represents the content of the moving image data.

The first word and the second word of the index information associated with the moving image data captured and recorded at the site of maintenance and inspection for the equipment represent the content of the moving image data. The content of the moving image data can be checked by referring to the first word and the second word of the index information.

The index information including the first word and the second word may be displayed on the moving image of the moving image data.

By referring to the index information, desired moving image data can be searched for.

In the first embodiment, while the moving image data obtained by capturing an image and collecting sound showing how the work for the air conditioner unit A is performed is described as an example, a work target such as maintenance and inspection, repair, or installation is not limited. The information processing method and the like according to the first embodiment may be applied to moving image data obtained by capturing an image and collecting sound showing how maintenance and inspection is performed for a chemical plant and other various facilities.

The information processing method and the like according to the first embodiment may be applied to moving image data or voice data captured or recorded for call center support, business support, or employee training.

While in the first embodiment, an example in which the index information is associated with moving image data is described, the information processing method according to the first embodiment may be applied to voice data. That is, the index information generated by the information processing method or the like according to the first embodiment may be stored in association with the voice data.

Second Embodiment

An information processing apparatus according to a second embodiment is different from that in the first embodiment in that moving image data is divided into a plurality of scenes, and index information is added to each scene. The information processing apparatus according to the second embodiment is different from that in the first embodiment in that a work report is automatically generated for moving image data obtained by capturing an image showing how work such as maintenance and inspection is performed for the air conditioner unit A. The information processing apparatus according to the second embodiment is different from that in the first embodiment in a method of playing moving image data. Since the other configurations and processing of the information processing system are the same as those of the information processing system according to the first embodiment, the same components are denoted by the same reference numerals, and detailed description thereof will be omitted.

Information Processing Method (Generation and Assignment of Index Information)

Figure 11:
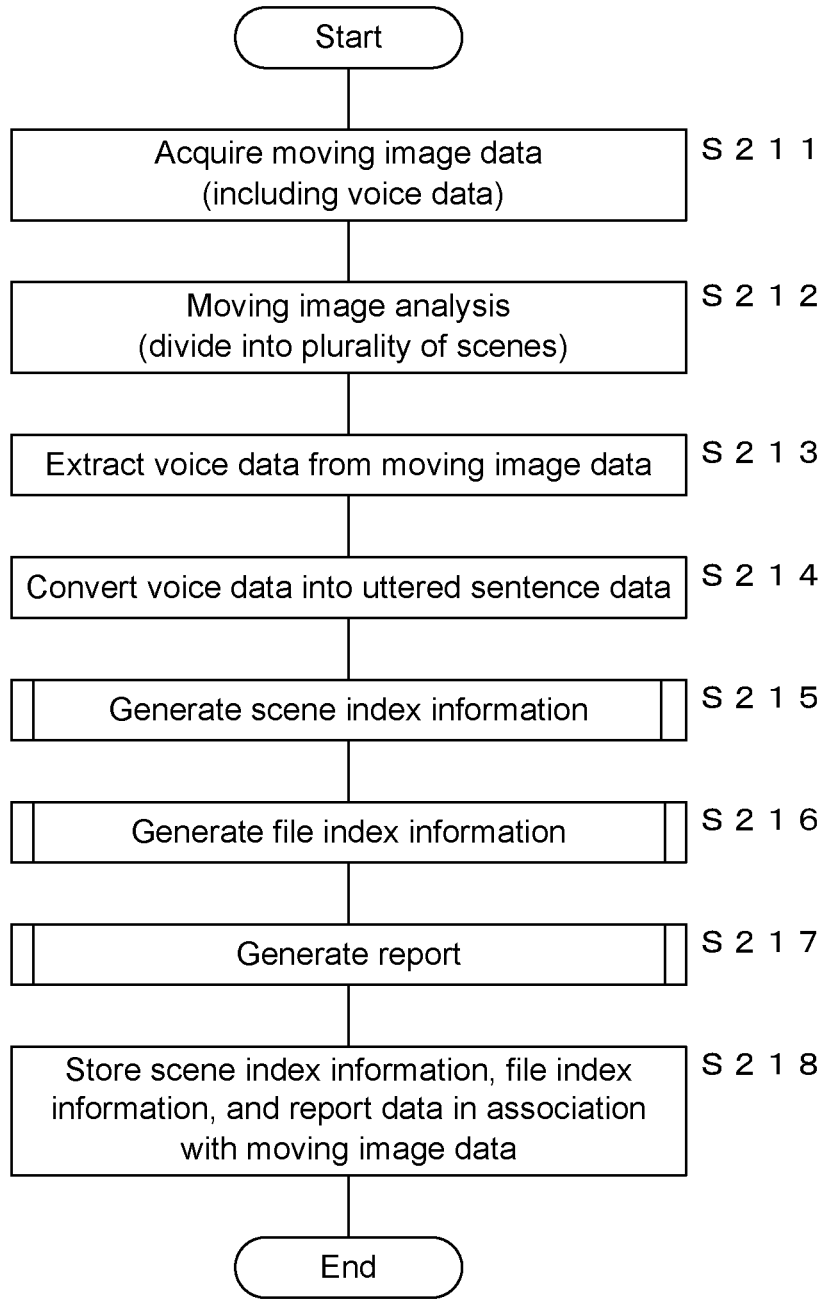
FIG. 11 is a flowchart illustrating an information processing procedure according to a second embodiment.

FIG. 11 is a flowchart illustrating an information processing procedure according to the second embodiment. The control unit 11 of the server apparatus 1 acquires the moving image data (step S211). The control unit 11 or the moving image processing unit 11e analyzes the moving image data and divides the moving image data, which is a single file, into a plurality of scenes (step S212). For example, the moving image processing unit 11e divides the content of the moving image into a plurality of scenes based on a change in the brightness of each frame image of the moving image, a change in the feature amount of an object, and the like. The control unit 11 stores, in the moving image DB 12b in association with the moving image data, scene data including information such as a scene number for identifying each scene, the number of an end frame of each scene, the running time indicating a start point and an end point of each scene as information indicating a plurality of scenes (see FIG. 17).

The control unit 11 extracts voice data from the acquired moving image data (step S213). The control unit 11 or the voice recognition unit 11a executes voice recognition processing to convert the extracted voice data into uttered sentence data in a text format (step S214). Specifically, the control unit 11 or the voice recognition unit 11a converts the voice data into the uttered sentence data in a text format, based on each of the breaks of the utterance. The control unit 11 or the voice recognition unit 11a temporarily stores, in the storage unit 12, an uttered sentence data group including the numbers for identifying a plurality of pieces of uttered sentence data, the running time indicating a play start point and an end point of each piece of uttered sentence data, and the uttered sentence data.

The control unit 11 executes processing of generating the index information based on the uttered sentence data of a plurality of scenes (step S215). Hereinafter, the index information generated based on the uttered sentence data of each scene is referred to as scene index information.

Figure 12:
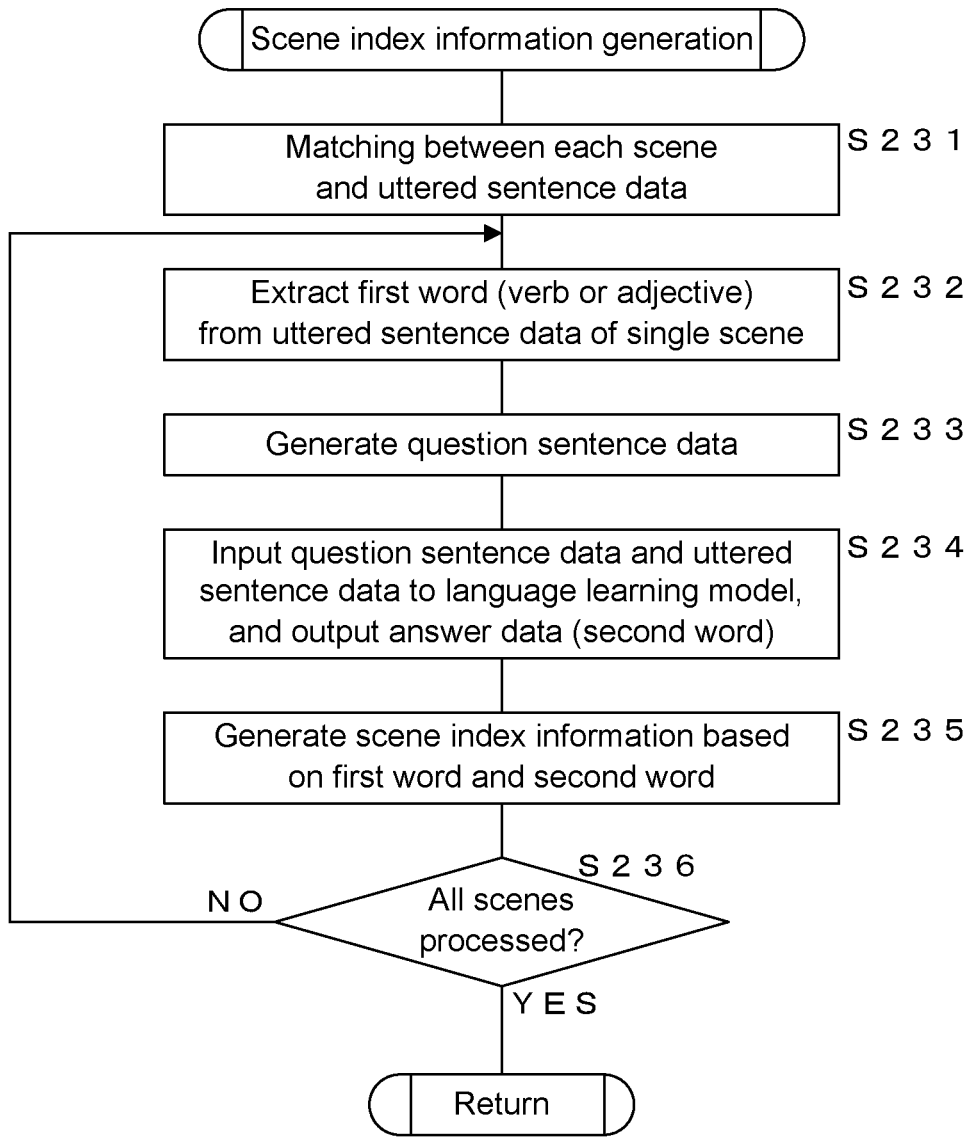
FIG. 12 is a flowchart illustrating a procedure for generating scene index information.

FIG. 12 is a flowchart illustrating a procedure for generating the scene index information. The control unit 11 performs matching between each scene of moving image data and uttered sentence data (step S231).

Figure 13:
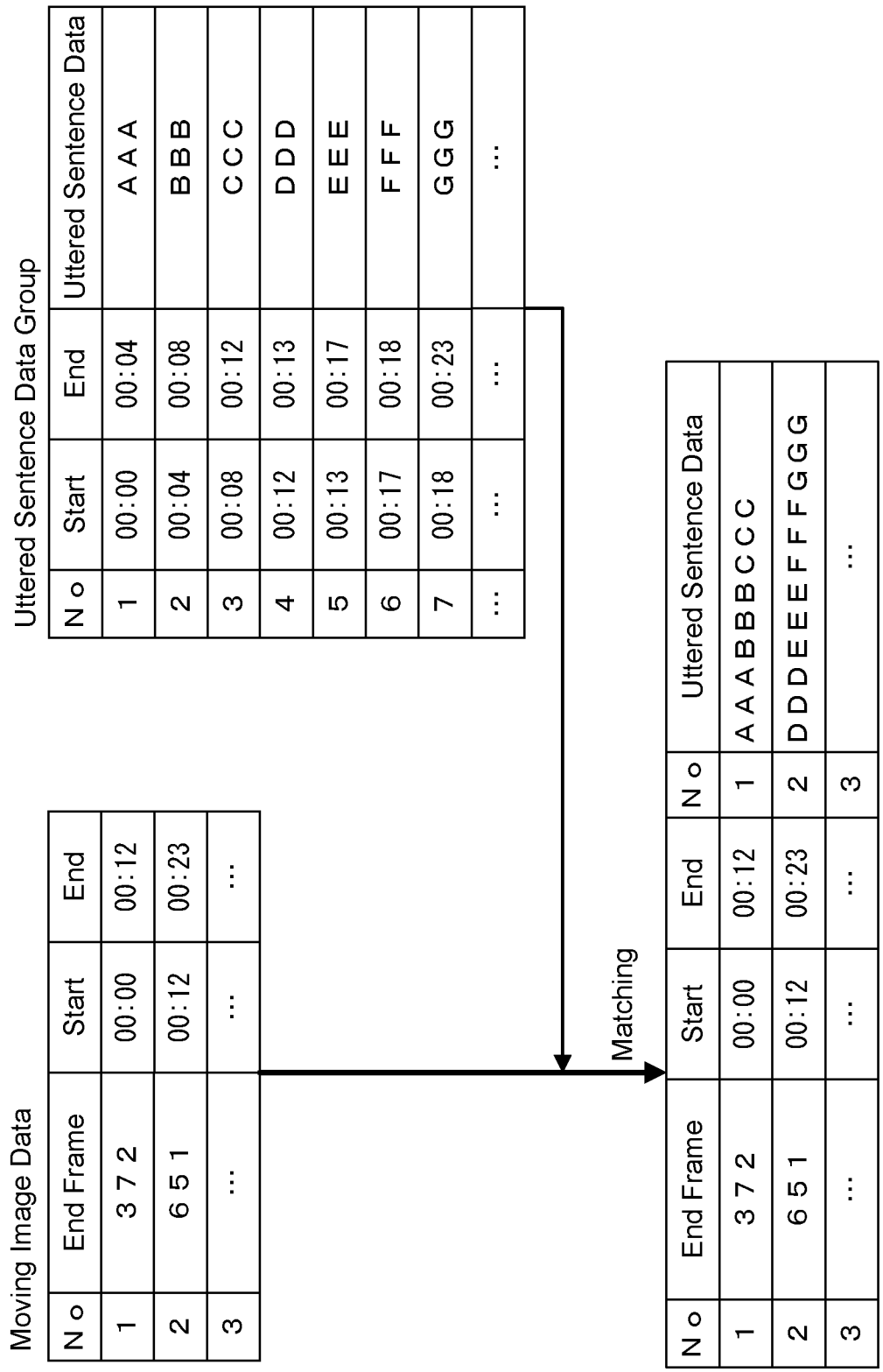
FIG. 13 is a conceptual diagram illustrating a method of matching between a scene of a moving image and uttered sentence data.

FIG. 13 is a conceptual diagram illustrating a method of the matching between a scene of a moving image and uttered sentence data. As illustrated in FIG. 13, the control unit 11 refers to scene data, and compares the start point and the end point of each scene with the start point and the end point of each of the plurality of pieces of uttered sentence data obtained by the conversion in step S214. The control unit 11 identifies uttered sentence data with a start point close to the start point of the scene. The control unit 11 identifies uttered sentence data with an end point close to the end point. The control unit 11 integrates the uttered sentence data with the start point of the scene identified, the uttered sentence data between the start point and the end point, and the uttered sentence data at the end point of the scene.

For example, the start point and the end point of the scene with scene number 1 are respectively 00:00 and 00:12. The uttered sentence data corresponding to the start point to the end point of the scene are uttered sentence data pieces No. 1 to No. 3, and thus the control unit 11 integrates the uttered sentence data pieces No. 1 to No. 3. Similarly, the start point and the end point of the scene with scene number 2 are respectively 00:12 and 00:23. The uttered sentence data corresponding to the start point to the end point of the scene are uttered sentence data pieces No. 4 to No. 7, and thus the control unit 11 integrates the uttered sentence data pieces No. 4 to No. 7.

The control unit 11 or the natural language processing unit 11b divides the uttered sentence data of one scene into morphemes through the morphological analysis processing, and extracts one or a plurality of first words, which are verbs or adjectives (step S232). The control unit 11 or the natural language processing unit 11b generates one or a plurality of pieces of question sentence data based on the one or a plurality of first words (step S233). The control unit 11 inputs the question sentence data and the uttered sentence data to the language learning model 12c, and makes the model output answer data (step S234). When there are a plurality of pieces of question sentence data, a plurality of pieces of corresponding answer data are obtained. The answer data includes a second word, which is a noun. The control unit 11 generates scene index information based on the first word and the second word (step S235).

The control unit 11 determines whether the processing of generating the scene index information has been completed for all the scenes (step S236). When it is determined that there is a scene for which scene index information has not been generated (step S236: NO), the control unit 11 returns the processing to step S232. When it is determined that the scene index information has been generated for all the scenes (step S236: YES), the processing of generating the index information of the scenes ends.

Referring back to FIG. 11, the control unit 11 executes processing of generating index information based on moving image data, which is a single file (step S216). Hereinafter, index information generated based on moving image data, which is a single file, is referred to as file index information.

Figure 14:
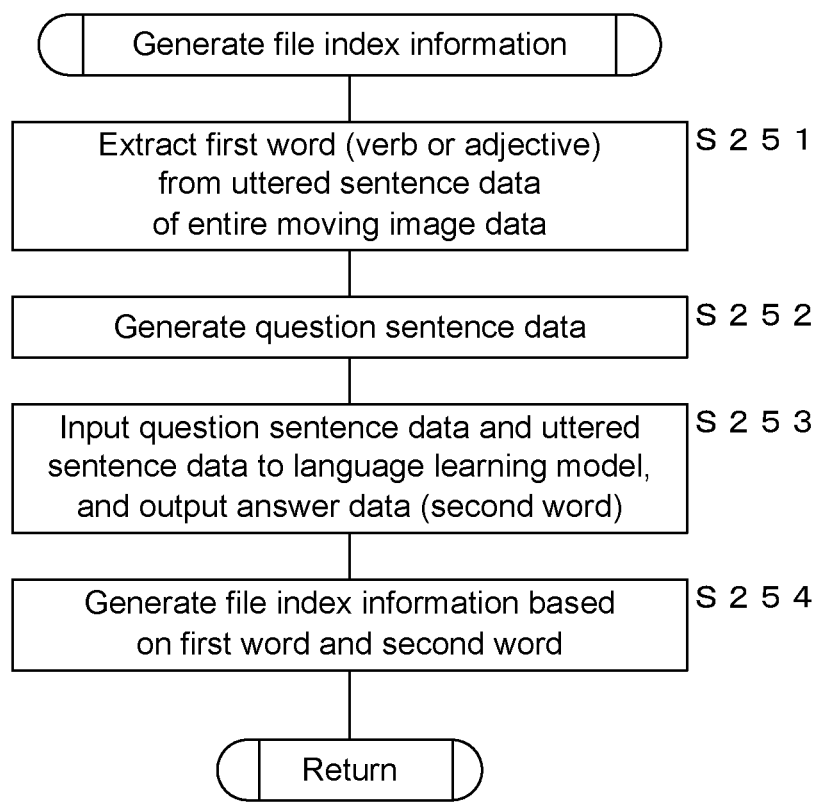
FIG. 14 is a flowchart illustrating a generation processing procedure of file index information.

FIG. 14 is a flowchart illustrating a generation processing procedure of the file index information. The control unit 11 or the natural language processing unit 11b divides the uttered sentence data (entire character string data) of the entire moving image data into morphemes through the morphological analysis processing, and extracts one or a plurality of first words, which are verbs or adjectives (step S251). The control unit 11 or the natural language processing unit 11b generates one or a plurality of pieces of question sentence data based on the one or a plurality of first words (step S252). The control unit 11 inputs the question sentence data and the uttered sentence data to the language learning model 12c, and makes the model output answer data (step S253). The answer data includes a second word, which is a noun. The control unit 11 generates file index information based on the first word and the second word (step S254), and ends the file index information generation processing.

Referring back to FIG. 11, the control unit 11 generates a report based on the uttered sentence data (step S217). The report includes information on work such as maintenance and inspection for the air conditioner unit A.

Figure 15:
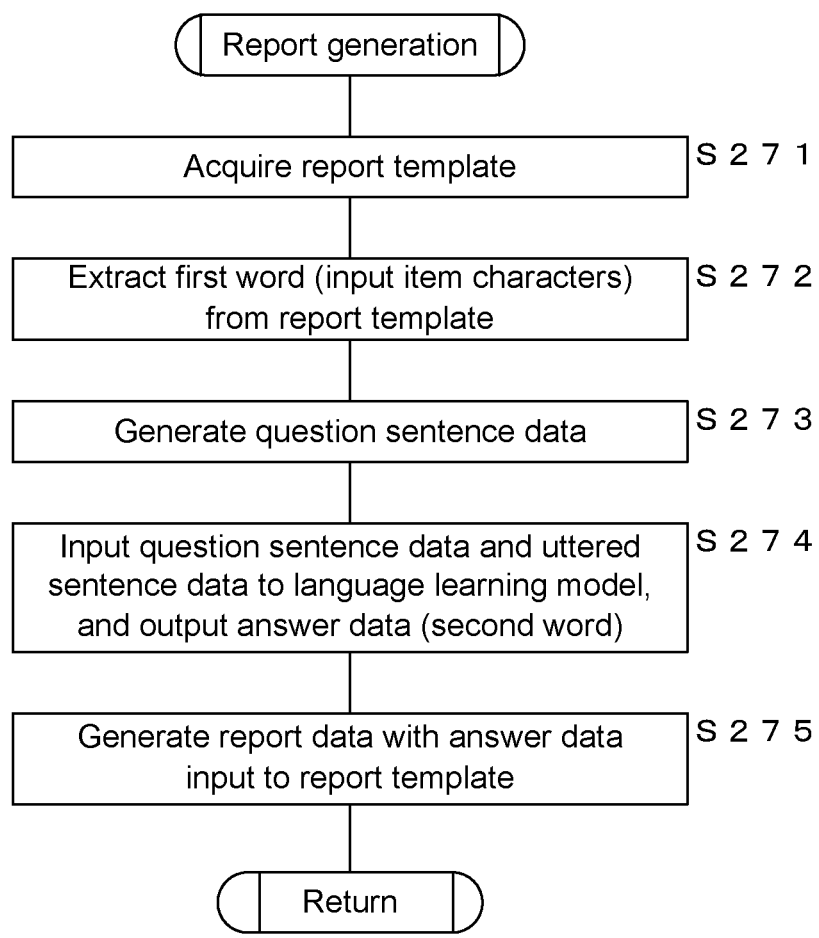
FIG. 15 is a flowchart illustrating a report generation procedure according to the second embodiment.

FIG. 15 is a flowchart illustrating a report generation procedure according to the second embodiment. The storage unit 12 of the server apparatus 1 stores a report template, and the control unit 11 of the server apparatus 1 acquires the report template from the storage unit 12 (step S271).

FIG. 16 is a schematic view illustrating an example of the report template. The report template includes a plurality of input item characters representing items for which information is to be input. The input item characters are, for example, "item", "repair location", "inquiry number", "customer name", "customer address", "telephone number", "model name", "repair date and time", and the like.

The control unit 11 extracts a plurality of first words, that is, a plurality of input item characters from the acquired report template (step S272). The control unit 11 or the natural language processing unit 11b generates a plurality of pieces of question sentence data based on the plurality of first words (step S273). The control unit 11 inputs the question sentence data and the uttered sentence data to the language learning model 12c, and makes the model output answer data (step S274). The answer data includes a second word, which is a noun. The second word is information to be input to the item indicated by the input item characters. The control unit 11 generates report data with the answer data input to the report template (step S275), and ends the report generation processing. The format of the report data is not limited, and the report data is, for example, array data in which the input item characters of the report template are associated with the answer data corresponding to the item. The report data may be image data in which the answer data is displayed in each item of the report template.

Referring back to FIG. 11, the control unit 11 stores the scene index information, the file index information, and the report data generated, in the storage unit 12 in association with the moving image data (step S218).

FIG. 17 is a conceptual diagram illustrating an example of the moving image DB 12b according to the second embodiment. As illustrated in FIG. 17, the control unit 11 associates file index information with moving image data, which is a single file. The control unit 11 associates scene index information with each of a plurality of scenes. Specifically, moving image data is associated with information indicating a scene number, an end frame number, and running time indicating a start point and an end point of each of a plurality of scenes. The control unit 11 stores, in the moving image DB 12b in association with each scene number, the scene index information corresponding to the scene. The control unit 11 associates the report data with the moving image data.

Moving Image Search Processing

Figure 18:
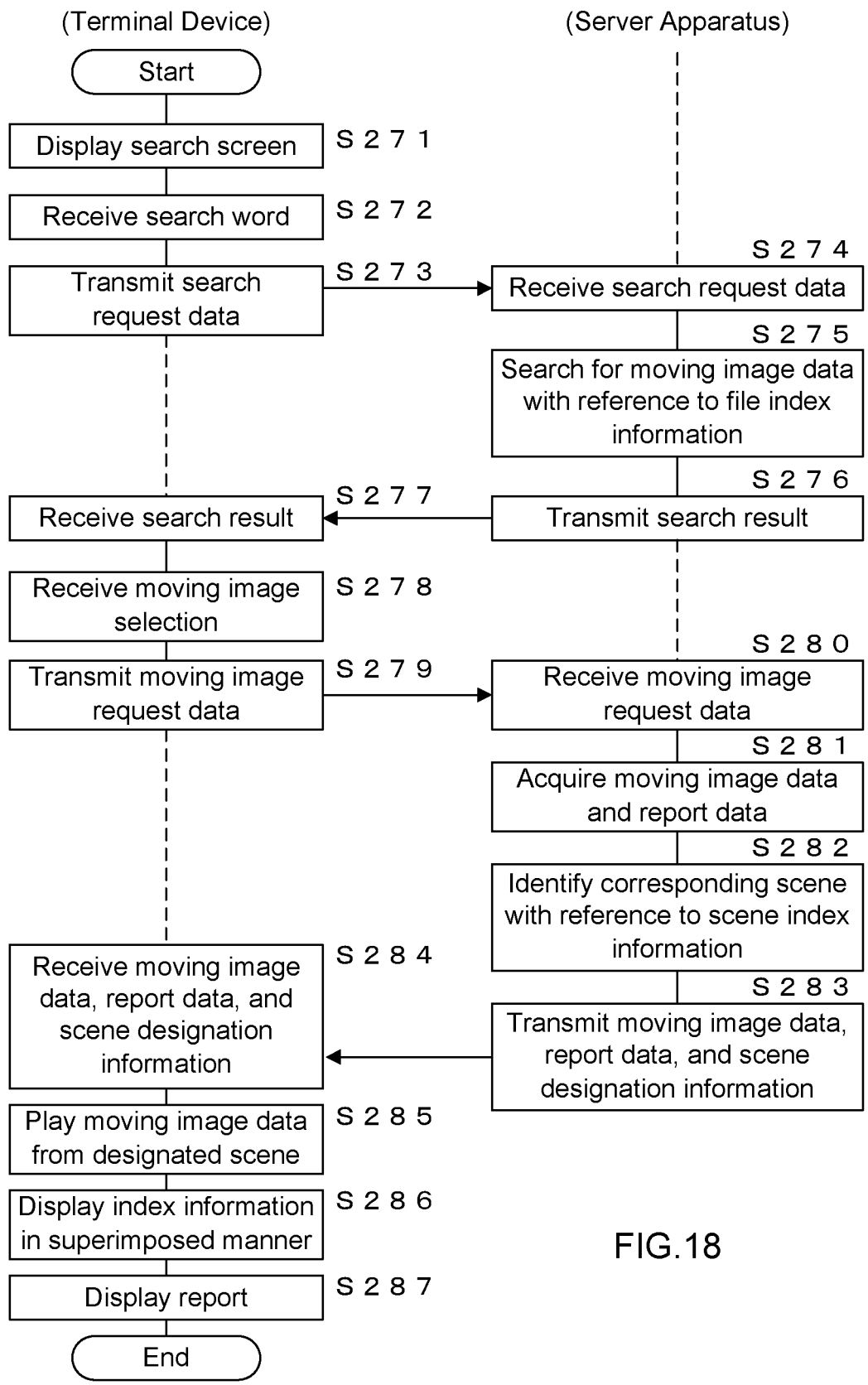
FIG. 18 is a flowchart illustrating a moving image search processing procedure according to the second embodiment.

FIG. 18 is a flowchart illustrating a moving image search processing procedure according to the second embodiment. The control unit 31 of the terminal device 3 and the control unit 11 of the server apparatus 1 execute the processing that is the same as that in steps S171 to S180 described in the first embodiment, and the server apparatus 1 receives the moving image request data through the communication unit 13 (steps S271 to S280). In step S275, the control unit 11 refers to the file index information associated with the moving image data to search for the moving image data. The content of the processing is the same as that in the first embodiment.

The control unit 11 of the server apparatus 1 acquires the moving image data, the file index information, and the report data indicated by the moving image request data (step S281). The control unit 11 refers to the scene index information using the search word included in the search request data as a key, thereby identifying a scene matching the search word (step S282).

The control unit 11 transmits the acquired moving image data, file index information, scene data, and scene designation information designating the scene identified in step S282 to the terminal device 3 that has requested the moving image through the communication unit 13 (step S283).

The control unit 31 of the terminal device 3 receives the moving image data, the file index information, the scene data, the scene index information, and the scene designation information transmitted from the server apparatus 1 through the communication unit 33 (step S284). The control unit 31 plays the received moving image data on the display unit 34 from the scene indicated by the scene designation information (step S285). The control unit 31 makes the file index information and the index information of the scene corresponding to the scene currently being played, displayed in a superimposed manner on the moving image (step S286). Specifically, by referring to the scene data, the control unit 31 identifies the scene currently being played and the scene index information corresponding to the scene. The control unit 31 makes the file index information and the index information of the identified scene displayed in a superimposed manner on the moving image.

The control unit 31 makes the received report data displayed on the display unit 34 (step S287). The control unit 31 may be configured to make the report data in response to the operation displayed on the operation unit 35.

Figure 19:
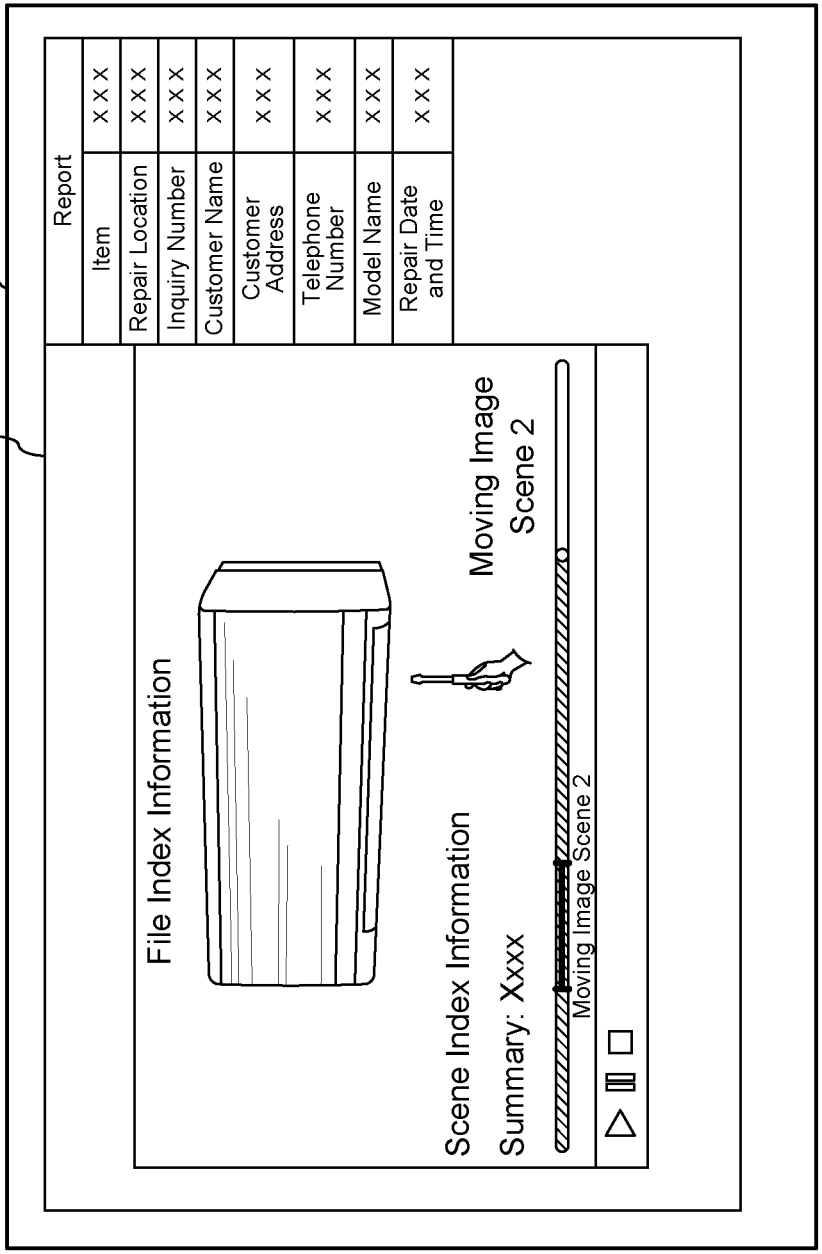
FIG. 19 is a schematic view illustrating an example of a moving image play screen according to the second embodiment.

FIG. 19 is a schematic view illustrating an example of the moving image play screen 34a according to the second embodiment. The terminal device 3 displays, for example, the moving image play screen 34a on the display unit 34. The terminal device 3 displays a moving image based on the moving image data received from the server apparatus 1, at the center of the moving image play screen 34a. The control unit 31 of the terminal device 3 makes the file index information and the scene index information displayed in a superimposed manner respectively on the upper part and the lower part of the moving image. The control unit 31 makes the scene number displayed in a superimposed manner on the lower right part of the moving image. The control unit 31 may be configured to make a character string obtained by summarizing the uttered sentence data of the moving image data by a known technique, displayed in a superimposed manner on the moving image. The file index information, the scene index information, the scene number, and the display position of the summary are examples.

The control unit 31 makes the report displayed on the moving image play screen 34a based on the report data. For example, the control unit 31 makes the report data displayed side by side with the moving image.

With the information processing system and the like according to the second embodiment, the scene index information accurately representing the content of each of a plurality of scenes obtained by dividing moving image data can be stored in the moving image DB 12b in association with the scenes.

The scene index information accurately representing the content of a file of the moving image data not divided can be stored in the moving image DB 12b in association with the file.

The moving image data can be played automatically from the scene associated with the search word.

Based on the moving image data, a report of work such as maintenance and inspection for the air conditioner unit A can be automatically generated. The first word is extracted from the report template to generate the question sentence data. The first word indicates the item to be input to the report. The second word extracted from the uttered sentence data using the question sentence data is information corresponding to the item. By inputting the second word to the template, report data representing the content of the moving image data can be generated.

The terminal device 3 can display the report and play the moving image data.

Third Embodiment

An information processing apparatus according to a third embodiment is different from those of the first and the second embodiments in that the question sentence data is generated with the first word extracted from the uttered sentence data by using dictionary data 312d. Since the other configurations and processing of the information processing system are the same as those of the information processing system according to the first and the second embodiments, the same components are denoted by the same reference numerals, and detailed description thereof will be omitted.

Figure 20:
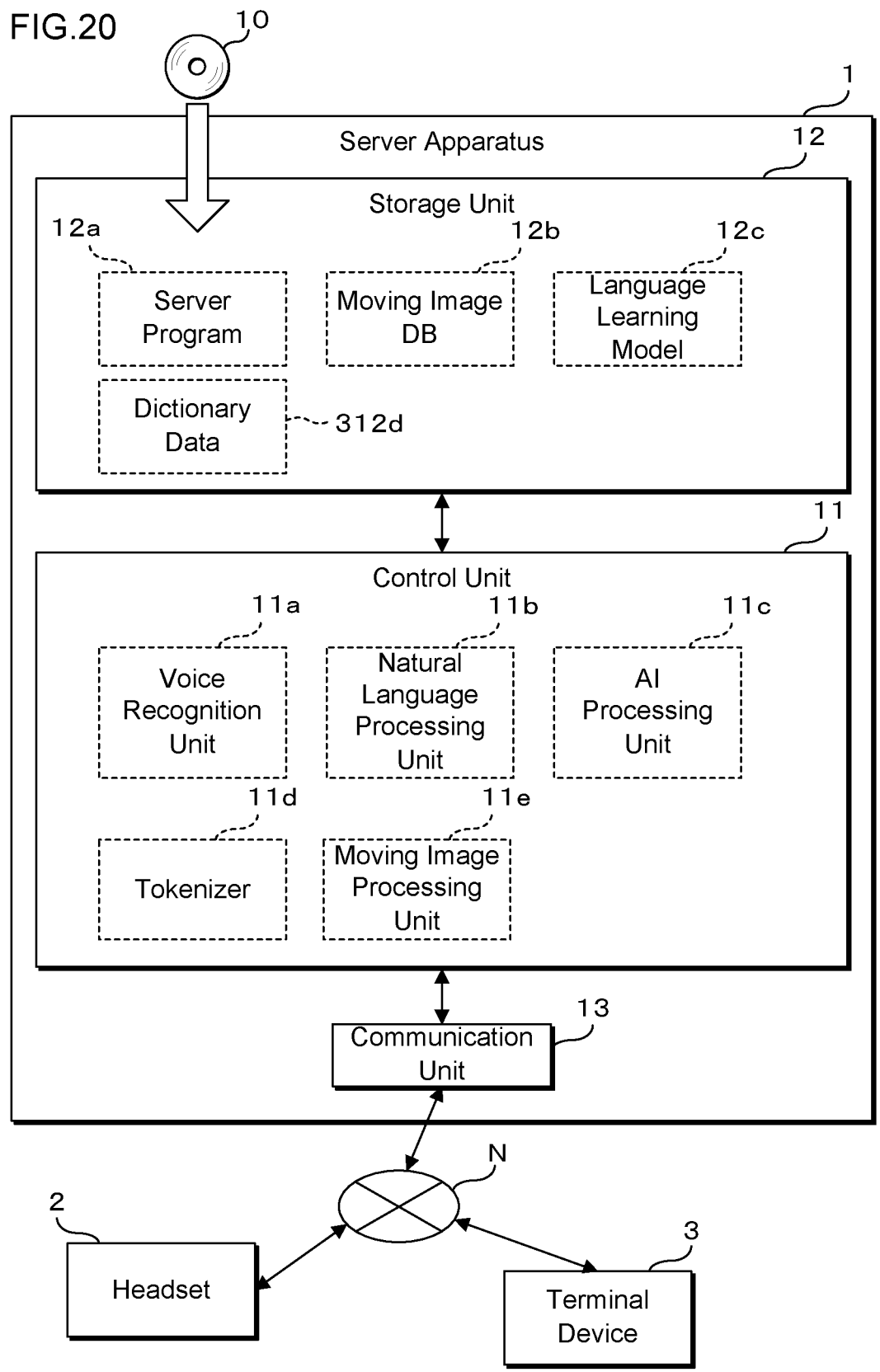
FIG. 20 is a block diagram illustrating a configuration of a server apparatus according to a third embodiment.

FIG. 20 is a block diagram illustrating a configuration of the server apparatus 1 according to the third embodiment. The storage unit 12 of the server apparatus 1 according to the third embodiment stores the dictionary data 312d. The dictionary data 312d stores a verb and an adjective (predetermined word) suitable for generating question sentence data, and a verb and an adjective unsuitable for generating question data.

When extracting the first word from the uttered sentence data, the control unit 11 selects the dictionary data 312d, and makes a selection. For example, the control unit 11 determines whether a verb or an adjective extracted from the uttered sentence data matches a verb or an adjective stored in the dictionary data 312d as a verb and an adjective suitable for generating the question sentence data, and extracts the verb or the adjective as the first word upon determining that they match. The control unit 11 determines whether a verb or an adjective extracted from the uttered sentence data matches a verb or an adjective stored in the dictionary data 312d as a verb and an adjective unsuitable for generating the question sentence data, and does not extract the verb or the adjective as the first word upon determining that they match. The control unit 11 may extract as the first word, a verb or an adjective that is extracted from the uttered sentence data and not listed in the dictionary data 312d.

The processing after the first word extraction is the same as that in the first embodiment and the second embodiment, and the question sentence data is generated, the answer data is acquired from uttered sentence data, and the index information is generated.

According to the third embodiment, the server apparatus 1 can generate more accurate question sentence data. By inputting appropriate question sentence data and uttered sentence data to the language learning model 12c, it is possible to output more accurate answer data (second data). Therefore, it is possible to generate index information more accurately representing the content of the moving image data and associate the index information with the moving image data.

Fourth Embodiment

The information processing apparatus according to a fourth embodiment is different from those of the first to the third embodiments in that the generated index information is output to the outside. Since the other configurations and processing of the information processing system are the same as those of the information processing system according to the first to the third embodiments, the same components are denoted by the same reference numerals, and detailed description thereof will be omitted.

FIG. 21 is a flowchart illustrating an index information generation processing procedure according to the fourth embodiment. The control unit 11 of the server apparatus 1 executes the processing that is the same as that in steps S111 to S116 described in the first embodiment, and the server apparatus 1 obtains the first word representing the content of the moving image data and the answer data (second word) (steps S411 to S416). The control unit 11 outputs to the outside the question sentence data including the first word and the answer data (second word) together with the moving image data (step S417). For example, the control unit 11 plays the moving image data and makes the question sentence data and the answer data displayed on an external display device. The control unit 11 may output or transmit the moving image data, the question sentence data, and the answer data to an external computer.

The control unit 11 that executes the processing in step S417 functions as an output unit that outputs the question data including the first word and the second word together with the moving image data.

According to the fourth embodiment, the index information accurately representing the content of moving image can be output to the outside together with the moving image data.

While embodiments have been described above, the present invention is not limited to these examples. It should be understood that various changes in mode and detail may be made without departing from the spirit and scope of the claims. Further, at least parts of the above-described embodiments may be arbitrarily combined.

The invention claimed is:

1. An information processing method, executed by a processing unit of an information processing apparatus, the information processing method comprising:
    converting voice data into character string data;
    generating question data by extracting a first word from the character string data;
    extracting a second word from the character string data by inputting the character string data and the question data to a trained language learning model, the trained language learning model being configured to output a word corresponding to an answer to the question data from the character string data when the character string data and the question data are input to the trained language learning model; and
    storing the voice data, the first word, and the second word in association with each other,
    wherein
    the voice data is sectionalized into a plurality of sections, each of the plurality of sections corresponding to a scene, and
    the processing unit
        generates the question data by extracting the first word from the character string data of each of the plurality of sections,
        extracts the second word from the character string data of each section by inputting the character string data and the question data to the language learning model, and stores, in association with each of the plurality of sections, the first word related to the section and the second word related to the section.

2. The information processing method according to claim 1, wherein
the first word is a verb or an adjective, and
the second word is a noun.

3. The information processing method according to claim 1, wherein
the processing unit generates the question data by extracting, as the first word, a word in dictionary data that stores a predetermined word among a plurality of verb or adjective words included in the character string data.

4. The information processing method according to claim 1, wherein
a plurality of the first words and a plurality of the second words are provided.

5. The information processing method according to claim 1, wherein
the processing unit
generates the question data by extracting the first word from entire character string data of the voice data,
extracts the second word from entire character string data in the voice data by inputting the character string data and the question data to the language learning model, and
stores, in association with a file of the voice data, the first word related to the file and the second word related to the file.

6. The information processing method according to claim 1, wherein
the processing unit
generates the question data by extracting the first word from a template of a report including characters,
inputs the second word extracted from the character string data to the template, and
stores report data in which the second word is input to the template in association with the voice data.

7. An information processing method, executed by a processing unit of an information processing apparatus the information processing method comprising:
acquiring moving image data captured and recorded at a site of maintenance and inspection of a device;
converting voice data included in the acquired moving image data into character string data;
generating question data by extracting a first word from the character string data, the question data including the first word;
extracting a second word from the character string data by inputting the character string data and the question data to a trained language learning model, the trained language learning model being configured to output a word corresponding to an answer to the question data from the character string data when the character string data and the question data are input to the trained language learning model; and
storing the moving image data, the first word, and the second word in association with each other.

8. The information processing method according to claim 7, wherein
the processing unit displays the first word and the second word related to a moving image of the moving image data on the moving image in a superimposed manner.

9. The information processing method according to claim 1, wherein
the processing unit
receives a search request including a character, and
from a plurality of pieces of the voice data stored in a database, detects the voice data associated with the first word and the second word related to the character in the search request.

10. An information processing method, executed by a processing unit of an information processing apparatus, the information processing method comprising:
converting voice data included in moving image data into character string data;
generating question data by extracting a first word from the character string data;
extracting a second word from the character string data by inputting the character string data and the question data to a trained language learning model, the trained language learning model being configured to output a word corresponding to an answer to the question data from the character string data when the character string data and the question data are input to the trained language learning model; and
outputting the question data including the first word and the second word together with the moving image data,
wherein
the moving image data is sectionalized into a plurality of sections, each of the plurality of sections corresponding to a scene, and
the processing unit
generates the question data by extracting the first word from the character string data of each of the plurality of sections,
extracts the second word from the character string data of each section by inputting the character string data and the question data to the language learning model, and
stores, in association with each of the plurality of sections, the first word related to the section and the second word related to the section.

11. An information processing apparatus comprising:
a processing unit configured to
convert voice data into character string data,
generate question data by extracting a first word from the character string data, and
extract a second word from the character string data by inputting the character string data and the question data to a trained language learning model, the trained language learning model being configured to output a word corresponding to an answer to the question data from the character string data when the character string data and the question data are input to the trained language learning model; and
a storage unit configured to store the voice data, the first word, and the second word in association with each other,
wherein
the voice data is sectionalized into a plurality of sections, each of the plurality of sections corresponding to a scene, and
the processing unit
generates the question data by extracting the first word from the character string data of each of the plurality of sections, extracts the second word from the character string data of each section by inputting the character string data and the question data to the language learning model, and stores, in association with each of the plurality of sections, the first word related to the section and the second word related to the section in the storage unit.

12. An information processing apparatus comprising:
a processing unit configured to
convert voice data included in moving image data into character string data,
generate question data by extracting a first word from the character string data, and
extract a second word from the character string data by inputting the character string data and the question data to a trained language learning model, the trained language learning model being configured to output a word corresponding to an answer to the question data from the character string data when the character string data and the question data are input to the trained language learning model; and
an output unit configured to output the question data including the first word and the second word together with the moving image data; and
a storage unit,
wherein
the moving image data is sectionalized into a plurality of sections, each of the plurality of sections corresponding to a scene, and
the processing unit
generates the question data by extracting the first word from the character string data of each of the plurality of sections,
extracts the second word from the character string data of each section by inputting the character string data and the question data to the language learning model, and
stores, in association with each of the plurality of sections, the first word related to the section and the second word related to the section in the storage unit.

13. A non-transitory computer-readable storage medium storing a computer program configured to cause a computer to execute processing of:
converting voice data into character string data;
generating question data by extracting a first word from the character string data,
extracting a second word from the character string data by inputting the character string data and the question data to a trained language learning model, the trained language learning model being configured to output a word corresponding to an answer to the question data from the character string data when the character string data and the question data are input to the trained language learning model; and
storing the voice data, the first word, and the second word in association with each other,
wherein
the voice data is sectionalized into a plurality of sections, each of the plurality of sections corresponding to a scene, and
the computer program
generates the question data by extracting the first word from the character string data of each of the plurality of sections,
extracts the second word from the character string data of each section by inputting the character string data and the question data to the language learning model, and stores, in association with each of the plurality of sections, the first word related to the section and the second word related to the section.

14. A non-transitory computer-readable storage medium storing a computer program configured to cause a computer to execute processing of:
converting voice data included in moving image data into character string data,
generating question data by extracting a first word from the character string data;
extracting a second word from the character string data by inputting the character string data and the question data to a trained language learning model, the trained language learning model being configured to output a word corresponding to an answer to the question data from the character string data when the character string data and the question data are input to the trained language learning model; and
outputting the question data including the first word and the second word together with the moving image data,
wherein
the moving image data is sectionalized into a plurality of sections, each of the plurality of sections corresponding to a scene, and
the computer program
generates the question data by extracting the first word from the character string data of each of the plurality of sections,
extracts the second word from the character string data of each section by inputting the character string data and the question data to the language learning model, and
stores, in association with each of the plurality of sections, the first word related to the section and the second word related to the section.

15. The information processing method according to claim 7, further comprising:
outputting the moving image data including the first word and the second word together with the moving image data.

16. An information processing apparatus comprising:
a processing unit; and
a storage unit,
the processing unit configured to
acquire moving image data captured and recorded at a site of maintenance and inspection of a device,
convert voice data included in the moving image data into character string data,
generate question data by extracting a first word from the character string data, the question data including the first word, and
extract a second word from the character string data by inputting the character string data and the question data to a trained language learning model, the trained language learning model being configured to output, a word corresponding to an answer to the question data from the character string data when the character string data and the question data are input to the trained language learning model,
store the moving image data, the first word, and the second word in association with each other in the storage unit.

17. The information processing apparatus according to claim 16, wherein
the processing unit is further configured to output the question data including the first word and the second word together with the moving image data.

18. A non-transitory computer-readable storage medium storing a computer program configured to cause a computer to execute processing of:
acquiring moving image data captured and recorded at a site of maintenance and inspection of a device;
converting voice data included in the moving image data into character string data;
generating question data by extracting a first word from the character string data, the question data including the first word;
extracting a second word from the character string data by inputting the character string data and the question data to a trained language learning model, the trained language learning model being configured to output a word corresponding to an answer to the question data from the character string data when the character string data and the question data are input to the trained language learning model; and
storing the moving image data, the first word, and the second word in association with each other.

19. The non-transitory computer-readable storage medium according to claim 18, wherein
the computer program is further configured to cause the computer to output the question data including the first word and the second word together with the moving image data.

* * * * *